(12) United States Patent
Okamoto et al.

(10) Patent No.: US 7,101,283 B2
(45) Date of Patent: Sep. 5, 2006

(54) GAME MACHINE AND INFORMATION STORAGE MEDIUM

(75) Inventors: Shinichiro Okamoto, Tokyo (JP); Jun Toyoda, Tokyo (JP); Hiroshi Watanabe, Tokyo (JP)

(73) Assignee: Namco Ltd., Tokyo (JP)

( * ) Notice: Subject to any disclaimer, the term of this patent is extended or adjusted under 35 U.S.C. 154(b) by 687 days.

(21) Appl. No.: 09/819,168

(22) Filed: Mar. 27, 2001

(65) Prior Publication Data
US 2001/0049300 A1    Dec. 6, 2001

(30) Foreign Application Priority Data
Mar. 30, 2000    (JP)    ............... 2000-095950

(51) Int. Cl.
A63F 13/00    (2006.01)
A63F 9/24    (2006.01)
G06F 17/00    (2006.01)
G06F 19/00    (2006.01)

(52) U.S. Cl. ............... 463/30; 463/31; 463/32; 463/33; 463/34; 463/1; 345/418; 345/619

(58) Field of Classification Search ........... 463/30–36, 463/43, 46, 47, 1–8, 10, 15; 345/418–421, 345/427, 473, 474, 581, 619, 649, 650, 653, 345/654, 660–666, 672, 706, 949–952, 144
See application file for complete search history.

(56) References Cited

U.S. PATENT DOCUMENTS

| | | | | |
|---|---|---|---|---|
| 4,952,922 A | * | 8/1990 | Griffin et al. | 345/421 |
| 5,577,175 A | * | 11/1996 | Naka et al. | 345/427 |
| 5,616,031 A | * | 4/1997 | Logg | 434/38 |
| 5,768,415 A | * | 6/1998 | Jagadish et al. | 382/154 |
| 5,769,718 A | * | 6/1998 | Rieder | 463/31 |
| 5,831,584 A | * | 11/1998 | Socks et al. | 345/8 |
| 5,880,709 A | * | 3/1999 | Itai et al. | 345/629 |
| 5,909,218 A | * | 6/1999 | Naka et al. | 345/419 |
| 5,973,704 A | * | 10/1999 | Nishiumi et al. | 345/475 |
| 5,999,185 A | * | 12/1999 | Kato et al. | 345/420 |
| 6,017,272 A | * | 1/2000 | Rieder | 463/31 |
| 6,031,538 A | * | 2/2000 | Chupeau et al. | 345/419 |
| 6,139,433 A | * | 10/2000 | Miyamoto et al. | 463/32 |
| 6,183,367 B1 | * | 2/2001 | Kaji et al. | 463/42 |
| 6,203,431 B1 | * | 3/2001 | Miyamoto et al. | 463/31 |
| 6,227,973 B1 | * | 5/2001 | Kikuchi | 463/31 |
| 6,431,982 B1 | * | 8/2002 | Kobayashi | 463/4 |
| 6,582,308 B1 | * | 6/2003 | Yamajiri et al. | 463/31 |

FOREIGN PATENT DOCUMENTS

| | | |
|---|---|---|
| JP | 7-85312 | 3/1995 |
| JP | 9-50541 | 2/1997 |
| JP | 9-167256 | 6/1997 |
| JP | 9-299613 | 11/1997 |
| JP | 11-42370 | 2/1999 |
| JP | 2000-24313 | 1/2000 |

* cited by examiner

Primary Examiner—Xuan M. Thai
Assistant Examiner—Binh-An D. Nguyen
(74) Attorney, Agent, or Firm—Dellett & Walters

(57) ABSTRACT

A game machine is disclosed in which a visual point position is automatically changed after an elapse of a fixed time if an object exists between a player character and a visual point position as the player character is seen from the visual point position in a three-dimensional virtual space.

18 Claims, 25 Drawing Sheets

GAME MACHINE AND INFORMATION STORAGE MEDIUM

BACKGROUND OF THE INVENTION

The present invention relates to a game machine and an information storage medium for displaying a two-dimensional image obtained through the perspective projection conversion of a three-dimensional virtual space as looked from a predetermined visual point position.

Conventionally, a game has been well known in which a character (called a "player character") manipulated by the player is moved in a game space that is a three-dimensional virtual space to make an adventure while clearing a number of events occurring on the course. This kind of game, which is generally referred to as a role playing game, proceeds in such a way that the player character solves a given problem at a particular place, and throws down an enemy character arising on the course. In particular recently, along with the higher performance of processors and the development of image processing techniques, a method of representing the player character, the enemy character or the background by a three-dimensional object with the polygon is generally used.

In displaying an image within the game space on the screen, a perspective projection conversion process is performed by setting the visual point position at a predetermined location within the game space, and a two-dimensional image obtained through this conversion process is displayed.

By the way, in the conventional game machine in which the player character is represented by the three-dimensional object, a two-dimensional image is displayed in the game space as observed from the visual point position set at the predetermined location. Hence, if there is an obstruction between this visual point position and the player character, the player character disappears. Thereby, there was a problem of impairing the operability by the player.

To cope with this problem, various techniques have been known as disclosed in Japanese Patent Laid-Open Nos. 7-85312, 9-50541, and Japanese Patent No. 2902352. In a three-dimensional dynamic image creating apparatus as disclosed in Japanese Patent Laid-Open No. 7-85312, a camera position (visual point position) is automatically shifted to a position at which a subject corresponding to the player character can be seen. Also, in a virtual image generating apparatus as disclosed in Japanese Patent Laid-Open No. 9-50541 or a video game machine as disclosed in Japanese Patent No. 2902352, a transmission process for the obstruction is performed.

However, if any of the methods as disclosed in these patents is employed, the shift of visual point position or the transmission process is automatically performed when the player character is hidden behind the obstruction. Therefore, in the case where the player character is hidden behind the obstruction only in a moment, the visual point may be shifted, although the player can issue an operation command in a current state. Hence, there is a problem of rather impairing the operability and making it difficult to grasp the display contents. For example, in the case where the player character is hidden behind the obstruction only in a moment and then appears again as it is moved to an observable position, the visual point position should not be changed to grasp the movement direction of the player character and increase the operability. Also, in the case where the player character is hidden behind the obstruction in a moment and appears again repeatedly and alternately many times, the transmission process for the obstruction is repeated many times, resulting in a risk of making the display contents obscure.

SUMMARY OF THE INVENTION

The present invention has been achieved in the light of the above-mentioned problems, and it is an object of the invention to provide a game machine and an information storage medium in which the display contents can be grasped easily with the improved operability.

To attain the above object, a game machine of the invention includes movement instructing unit, space setting unit, image generating unit, timing decision unit, a timer, and visual point position setting unit. The movement instructing unit instructs the movement of a player character in a three-dimensional virtual space. The space setting unit sets the shapes of the player character and an object existing around it, and their arrangement in the virtual space. The image generating unit generates an image in the virtual space as seen from a virtual visual point position. The timing decision unit decides the timing at which the player character and the object satisfy relatively a predetermined relation for at least one of the shape and the arrangement in the virtual space. The timer measures a fixed time after the timing decision unit judges that the player character and the object satisfy the predetermined relation. The visual point position setting unit shifts the visual point position, along with the movement of the player character, so that the player character may be contained in a visual field range, and changes the visual point position in a predetermined range almost centered at the player character, when the elapse of the fixed time is detected by the timer. Since the visual point position is not changed immediately when the player character and the object satisfy the predetermined relation, but changed after the fixed time is measured by the timer, the unnecessary shift of the visual point can be avoided in the case where the player character and the object satisfy the predetermined relation only in a moment, making it possible to grasp the display contents easily. Also, since the movement of the player character can be continuously instructed while maintaining the field of view direction unchanged, the operability can be improved.

Also, a game machine of the invention includes movement instructing unit, space setting unit, image generating unit, timing decision unit, visual point position setting unit, and transmission processing unit. The movement instructing unit instructs the movement of a player character in a three-dimensional virtual space. The space setting unit sets the shapes of the player character and an object existing around it, and their arrangement in the virtual space. The image generating unit generates an image in the virtual space as seen from a virtual visual point position. The timing decision unit decides the timing at which the player character and the object satisfy relatively a predetermined relation for at least one of the shape and the arrangement in the virtual space. The timer measures a fixed time after the timing decision unit judges that the player character and the object satisfy the predetermined relation. The visual point position setting unit shifts the visual point position, along with the movement of the player character, so that the player character may be contained in a visual field range. The transmission processing unit makes transparent the object placed between the player character and the visual point position, when the timer detects the elapse of a fixed time. Since this transmission process is not performed immediately when the player character and the object satisfy the predetermined relation, but performed after the fixed time is measured by the timer, a situation where a transparent state and a non-transparent state are changed repeatedly and alternately in a short period can be avoided in the case where a state of whether or not the player character and the object satisfy the predetermined relation is switched frequently, making it possible to grasp the display contents easily. Also, since the display contents are grasped easily, the operability can be improved correspondingly.

Also, a game machine of the invention includes movement instructing unit, space setting unit, image generating unit, change instructing unit, and visual point position setting unit. The movement instructing unit instructs the movement of a player character in a three-dimensional virtual space. The space setting unit sets the shapes of the player character and an object existing around it, and their arrangement in the virtual space. The image generating unit generates an image in the virtual space as seen from a virtual visual point position. The change instructing unit instructs the change of the visual point position. The visual point position setting unit shifts the visual point position set in the virtual space, along with the movement of the player character, so that the player character may be contained in a visual field range, and changes the visual point position in a predetermined range almost centered at the player character, when a change instruction is made by the change instructing unit. Since the visual point position is not changed immediately when the player character and the object satisfy the predetermined relation, but changed only when the change instructing unit is operated by the player, the unnecessary shift of the visual point can be avoided in the case where the player character and the object satisfy the predetermined relation only in a moment, making it possible to grasp the display contents easily. Also, since the movement of the player character can be continuously instructed while maintaining the field of view direction unchanged, the operability can be improved.

Also, a game machine of the invention includes movement instructing unit, space setting unit, image generating unit, transmission instructing unit, visual point position setting unit, and transmission processing unit. The movement instructing unit instructs the movement of a player character in a three-dimensional virtual space. The space setting unit sets the shapes of the player character and an object existing around it, and their arrangement in the virtual space. The image generating unit generates an image in the virtual space as seen from a virtual visual point position. The transmission instructing unit instructs the transmission of the object. The visual point position setting unit shifts the visual point position, along with the movement of the player character, so that the player character may be contained in a visual field range. The transmission processing unit performs a transmission process for making transparent the object placed between the player character and the visual point position, when a transmission instruction is made by the transmission instructing unit. Since this transmission process is not performed immediately when the player character and the object satisfy the predetermined relation, but performed only when the change instructing unit is operated by the player, a situation where a transparent state and a non-transparent state are changed repeatedly and alternately in a short period can be avoided in the case where a state of whether or not the player character and the object satisfy the predetermined relation is switched frequently, making it possible to grasp the display contents easily. Also, since the display contents are grasped easily, the operability can be improved correspondingly.

Also, a game machine of the invention includes movement instructing unit, space setting unit, image generating unit, timing decision unit, and visual point position setting unit. The movement instructing unit instructs the movement of a player character in a three-dimensional virtual space. The space setting unit sets the shapes of the player character and an object existing around it, and their arrangement in the virtual space. The image generating unit generates an image in the virtual space as seen from a virtual visual point position. The timing decision unit decides the timing at which the player character and the object satisfy relatively a predetermined relation for at least one of the shape and the arrangement in the virtual space. The visual point position setting unit shifts the visual point position, along with the movement of the player character, so that the player character may be contained in a visual field range, and changes the visual point position slowly at first and increasingly faster with the elapse of the time in a predetermined range almost centered at the player character, when the timing decision unit decides that the player character and the object satisfy the predetermined relation. Since the visual point position is not changed rapidly when the player character and the object satisfy the predetermined relation, but changed slowly at first, the visual point is scarcely shifted in the case where the player character and the object satisfy the predetermined relation only in a moment, making it possible to grasp the display contents easily. Also, since the movement of the player character can be continuously instructed while maintaining the field of view direction unchanged, the operability can be improved.

Also, a game machine of the invention includes movement instructing unit, space setting unit, image generating unit, timing decision unit, visual point position setting unit, and transmission processing unit. The movement instructing unit instructs the movement of a player character in a three-dimensional virtual space. The space setting unit sets the shapes of the player character and an object existing around it, and their arrangement in the virtual space. The image generating unit generates an image in the virtual space as seen from a virtual visual point position. The timing decision unit decides the timing at which the player character and the object satisfy relatively a predetermined relation for at least one of the shape and the arrangement in the virtual space. The visual point position setting unit shifts the visual point position, along with the movement of the player character, so that the player character may be contained in a visual field range. The transmission processing unit performs a transmission process of changing the degree of transparency for an object placed between the player character and the visual point position, slowly at first and increasingly faster with the elapse of the time, when the timing decision unit decides that the player character and the object satisfy the predetermined relation. Since the transmission process for the object is not performed rapidly when the player character and the object satisfy the predetermined relation, but performed to change the degree of transparency for the object slowly at first, a situation where the appearance of the object is largely changed in a short period can be avoided in the case where a state of whether or not the player character and the object satisfy the predetermined relation is switched frequently, making it possible to grasp the display contents easily. Also, since the display contents are grasped easily, the operability can be improved correspondingly.

Also, a game machine of the invention includes movement instructing unit, space setting unit, image generating unit, timing decision unit, visual point position setting unit, and composition processing unit. The movement instructing unit instructs the movement of a player character in a three-dimensional virtual space. The space setting unit sets the shapes of the player character and an object existing around it, and their arrangement in the virtual space. The image generating unit generates an image in the virtual space as seen from a virtual visual point position. The timing decision unit decides the timing at which the player character and the object satisfy relatively a predetermined relation for at least one of the shape and the arrangement in the virtual space. The visual point position setting unit shifts the visual point position, along with the movement of the player character, so that the player character may be contained in a visual field range. When the timing decision unit decides that the player character and the object satisfy the predetermined relation, the composition processing unit generates a mark image indicating the existing position of the player character and composites the mark image on the image generated by the image generating unit. Since the existing position of the player character can be known by displaying the predetermined mark image when the player character and the object satisfy the predetermined relation, it is possible to avoid an abrupt change in the visual field direction which may arise when the visual point is shifted abruptly, and prevent the operability from being lowered.

Also, a game machine of the invention includes movement instructing unit, space setting unit, image generating unit, timing decision unit, return instructing unit, and visual point position setting unit. The movement instructing unit instructs the movement of a player character in a three-dimensional virtual space. The space setting unit sets the shapes of the player character and an object existing around it, and their arrangement in the virtual space. The image generating unit generates an image in the virtual space as seen from a virtual visual point position. The timing decision unit decides the timing at which the player character and the object satisfy relatively a predetermined relation for at least one of the shape and the arrangement in the virtual space. The return instructing unit makes a return instruction of returning the changed visual point position to an original state, when the visual point position is changed. The visual point position setting unit shifts the visual point position, along with the movement of the player character, so that the player character may be contained in a visual field range, and changes the visual point position in a predetermined range almost centered at the player character, when the timing decision unit decides that the player character and the object satisfy the predetermined relation, as well as returning the changed visual point position to the original state, when a return instruction is issued by the return instructing unit. Though the visual point position is changed when the player character and the object satisfy the predetermined relation, the player can operate the return instructing unit to easily return the changed visual point position to an original state before shift, and continuously instruct the movement of the player character in the original state before change, whereby the good operability can be secured. Also, since the virtual space can be seen in the same visual field direction as before changing the visual point position, the display contents can be easily grasped.

Also, a game machine of the invention includes movement instructing unit, space setting unit, image generating unit, timing decision unit, return instructing unit, visual point position setting unit, and transmission processing unit. The movement instructing unit instructs the movement of a player character in at three-dimensional virtual space. The space setting unit sets the shapes of the player character and an object existing around it, and their arrangement in the virtual space. The image generating unit generates an image in the virtual space as seen from a virtual visual point position. The timing decision unit decides the timing at which the player character and the object satisfy relatively a predetermined relation for at least one of the shape and the arrangement in the virtual space. The return instructing unit makes a return instruction of returning the degree of transparency for the object to an original state, when the degree of transparency for the object is changed. The visual point position setting unit shifts the visual point position, along with the movement of the player character, so that the player character may be contained in a visual field range. The transmission processing unit performs a transmission process of changing the degree of transparency for the object placed between the player character and the visual point position when the timing decision unit decides that the player character and the object satisfy the predetermined relation, and when a return instruction is issued by the return instructing unit the transmission processing unit returns the changed degree of transparency to the original state. Though the transmission process for the object is performed when the player character and the object satisfy the predetermined relation, the player can operate the return instructing unit to return the changed degree of transparency easily to the original state before the transmission process, and continue to instruct the movement of the player character in the original state before the transmission process, as required, whereby the operability can be improved by choosing a display method that reflects the preference of the player.

The timing decision unit as described above preferably decides the timing at which the player character is intercepted by the object, as looked from the visual point position in the direction toward the player character, on the basis of the shapes of the player character and the object and their arrangement in the virtual space. Only when the player character operated by the player is hidden behind other object and invisible, the shift of the visual point and the transmission process for this object are performed, so that the frequency of shifting the visual point and the like is suppressed to the minimum, effecting the image display with less sense of incompatibility.

Also, the timing decision unit as described above preferably decides the timing at which the object is contained in a predetermined range around the player character. In this case, the timing decision can be effected through a simple process, enabling the processing load of the game machine to be lessened.

It is preferred to set the visual point position above the height of the player character, and the timing decision unit preferably effects the timing decision for an object above the height of the player character. Taking into consideration the height of the object in the decision by the timing decision unit, any object that has no danger of intercepting the player character can be excluded from the decision.

The visual point position setting unit as above described preferably changes the visual point position by rotating the visual point position by a predetermined angle around a rotational center of the player character position. If the visual point position is only rotated around the rotational center of the player character position, a function of rotating the visual point position only has to be added to return the changed visual point position to an original state.

In this case, the image generating unit preferably generates the image continuously, while the visual point position is being rotated by the visual point position setting unit. Since the contents of the display image are changed along with the change of the visual point position, the player can easily grasp how the visual point position is changed. Also, the visual point position setting unit preferably continues an operation of rotating the visual point position, until the player character is released from an intercepted state by the object as looked from the visual point position. Thereby, the visual point position can be rotated by a required angle.

Also, it is preferred to provide return instructing unit for issuing a return instruction to return the changed visual point position to an original state when the visual point position is changed, and the visual point position setting unit preferably returns the changed visual point position to an original state when a return instruction is issued by the return instructing unit. Though the visual point position is changed when the player character and the object satisfy the predetermined relation, the player can operate the return instructing unit to return the changed visual point position easily to an original state before shift, and continue to instruct the movement of the player character in the original state before change, whereby the good operability can be secured. Also, since the virtual space can be seen in the same visual field direction as before changing the visual point position, the display contents can be easily grasped.

Also, it is preferred to provide the return instructing unit for making a return instruction to return the changed state to an original state when the degree of transparency for an object is changed, and the visual point position setting unit preferably restores the degree of transparency for the object to an original state when a return instruction is issue by the return instructing unit. Though the transmission process for the object is performed when the player character and the object satisfy the predetermined relation, the player can operate the return instructing unit to return the changed degree of transparency for the object easily to the original state before the transmission process is started, and continue to instruct the movement of the player character in the original state before the transmission process, as required, whereby the operability can be improved by choosing a display method that reflects the preference of the player.

An information storage medium of the invention stores a program for enabling the computer to execute a process of deciding the timing at which a player character and an object existing around it satisfy relatively a predetermined relation for at least one of the shape and the arrangement in the virtual space, and changing the visual point position in a predetermined range almost centered at the player character after the elapse of a fixed time. By executing the program stored in this information storage medium, since the visual point position is not changed immediately when the player character and the object satisfy the predetermined relation, but changed after the fixed time is measured, the unnecessary shift of the visual point can be avoided in the case where the player character and the object satisfy the predetermined relation only in a moment, making it possible to grasp the display contents easily. Also, since the movement of the player character can be continuously instructed while maintaining the field of view direction unchanged, the operability can be improved.

Also, an information storage medium of the invention stores a program for enabling the computer to execute a process of deciding the timing at which a player character and an object existing around it satisfy relatively a predetermined relation for at least one of the shape and the arrangement in the virtual space, and transmitting the object placed between the player character and the visual point position after the elapse of a fixed time. By executing the program stored in this information storage medium, since the transmission process for the object is not performed immediately when the player character and the object satisfy the predetermined relation, but performed after the fixed time is measured, a situation where a transparent state and a non-transparent state are changed repeatedly and alternately in a short period can be avoided in the case where a state of whether or not the player character and the object satisfy the predetermined relation is switched frequently, making it possible to grasp the display contents easily. Also, since the display contents are easily grasped, the operability can be improved correspondingly.

DESCRIPTION OF THE PREFERRED EMBODIMENTS

A game machine according to one embodiment of the present invention will be described below with reference to the drawings.

First Embodiment

Figure 1:
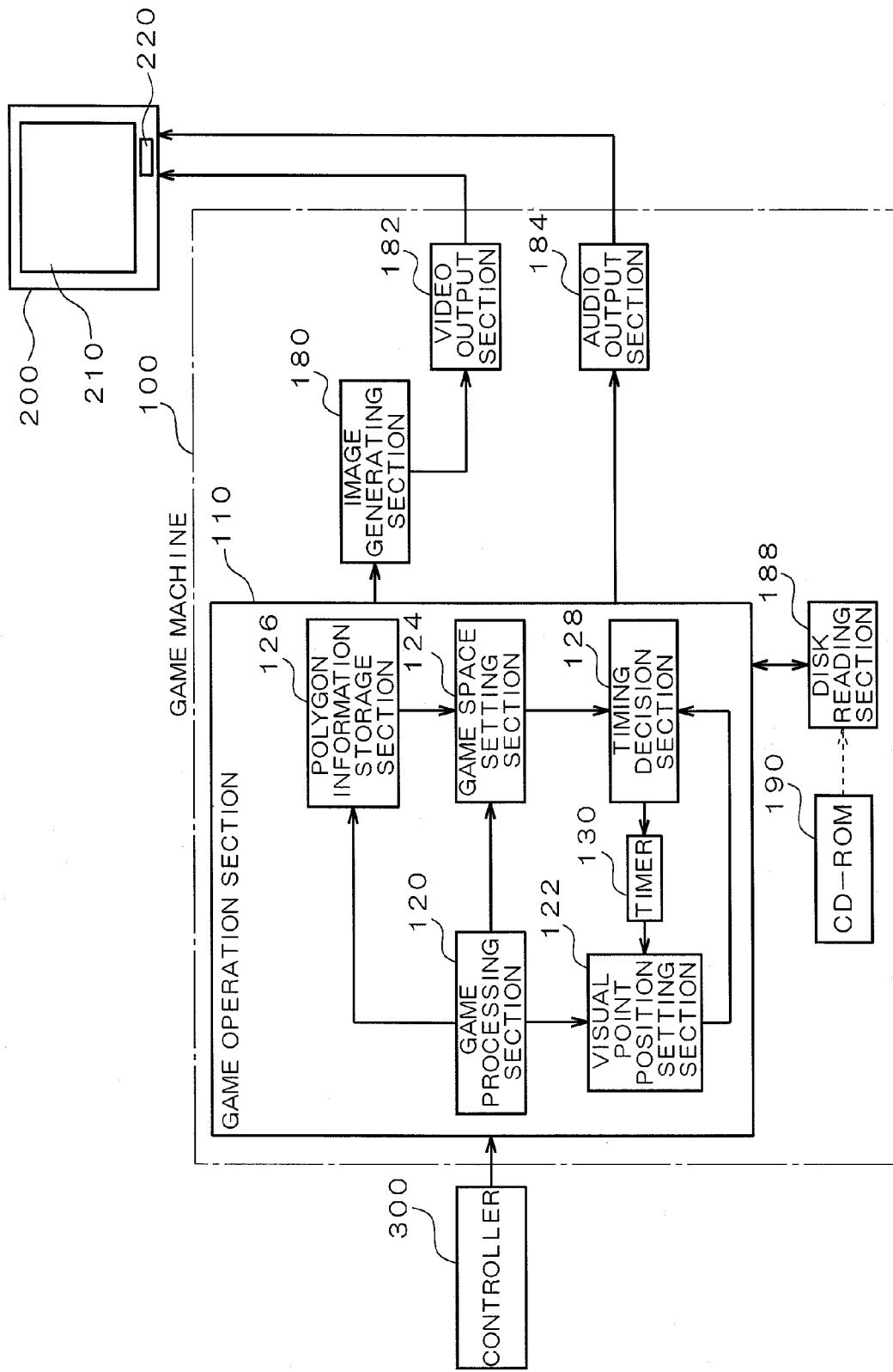
FIG. 1 is block diagram showing a configuration of a game machine according to a first embodiment of the present invention.
Figure 2:
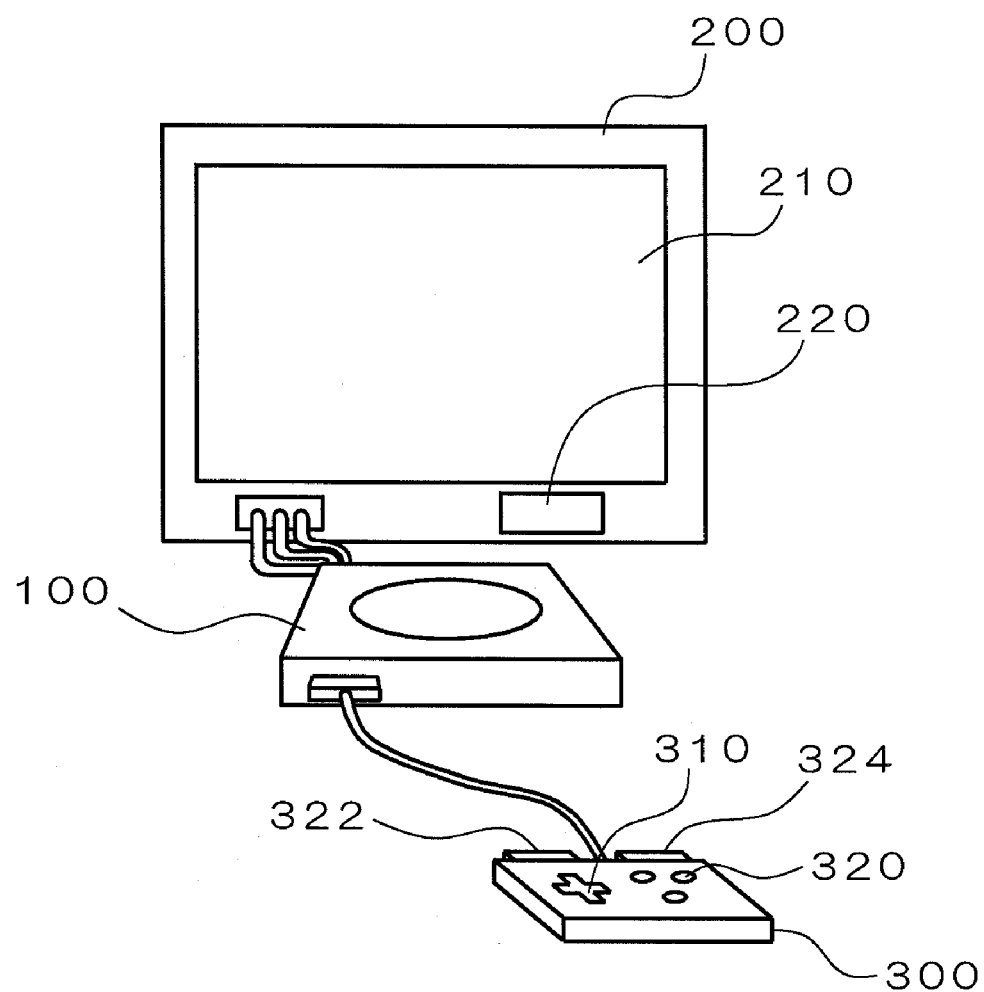
FIG. 2 is a view illustrating how the game machine and a peripheral device are connected.

FIG. 1 is a block diagram showing a configuration of a game machine according to a first embodiment of the invention. FIG. 2 is a view showing how the game machine and a peripheral device are connected in this embodiment. In this embodiment, explanation will be given of a home game machine, for example.

As shown in FIGS. 1 and 2, the game machine of the invention comprises a game machine 100 for performing a predetermined game operation by executing a game program stored in a CD-ROM 190 as an information storage medium to output a video signal to a game screen or a voice signal with various sorts of effect sounds, a television monitor unit 200 connected to the game machine 100, and a controller 300 that is operated at hand by the player.

The television monitor unit 200 comprises a display section 210 for displaying a game image on a display screen on the basis of a video signal entered from the game machine 100, and a speaker 220 for translating a voice signal input from the game machine 100 into the voice. The display section 210 is constituted of a CRT (Cathode Ray Tube), an LCD (Liquid Crystal Display), or a liquid crystal projector, for example. The controller 300 comprises a cross cursor key 310 capable of pointing to any of eight directions, a plurality of pushbutton switches 320 that are selectively pressed as required, a left key 322 and a right key 324.

The game machine 100 comprises a game operation section 110, an image generating section 180, a video output section 182, an audio output section 184, and a disk reading section 188. The game operation section 110 performs various sorts of game operations by executing a game program employing a CPU, a ROM and a RAM, for example. The details of the game operation section 110 will be described later.

The image generating section 180 generates a two-dimensional game image by converting each object within a three-dimensional game space onto a projection plane in a predetermined visual point coordinate system on the basis of the data regarding the position of each object within a three-dimensional game space that is obtained by an arithmetic calculation of the game operation section 110 and the visual point position set at this time. The image data corresponding to the two-dimensional generated game image is stored in a VRAM contained in the image generating section 180.

The video output section 182 outputs a video signal to the display section 210 of the television monitor device 200 by reading the image data generated by the image generating section 180 and stored in the VRAM in the scan order and converting it into an NTSC signal. Also, the audio output section 184 outputs an audio signal to the speaker 220 within the television monitor device 200 by converting various sorts of audio data output from the game operation section 110 into the analog voice signal.

The disk reading section 188 reads various sorts of data stored in a CD-ROM 190 mounted. The CD-ROM 190 stores a game program containing the image data necessary to make a high definition graphic display, and the disk reading section 188 sends the game program read from the CD-ROM 190 to the game operation section 110.

Also, the game operation section 110 comprises a game processing section 120, a visual point position setting section 122, a game space setting section 124, a polygon information storage section 126, a timing decision section 128, and a timer 130.

The game processing section 120 performs various kinds of game processing to output a result of processing to the game space setting section 124, as well as moving a player character located within the three-dimensional game space in accordance with an operation instruction signal output from the controller 300. For example, various kinds of game processing corresponding to a roll playing game include a process of generating an event under predetermined conditions, and a combat process that is conducted between the player character and an enemy character which is encountered.

The visual point position setting section 122 sets the visual point position required to generate a two-dimensional game image in the image generating section 180 along with the movement status of the player character located within the three-dimensional game space. For example, if the movement of the player character is instructed by the player manipulating the cross cursor key 310 of the controller 300, the visual point position is automatically shifted while maintaining a relative positional relation with the player character so that the player character is not out of the display screen.

The game space setting section 124 performs the arithmetical calculation of a detailed shape of each object corresponding to the player character or the background within the three-dimensional game space, on the basis of a result of the game processing output from the game processing section 120. This arithmetic calculation is made by reading the vertex data of one or more polygons making up each object from the polygon information storage section 126, the result of arithmetic calculation being output to the image generating section 180.

The polygon information storage section 126 stores the data regarding each polygon read from the CD-ROM 190 by the disk reading section 188. For example, the identification information of the vertex coordinates of each polygon and the texture, in the case where there exist corresponding texture is stored.

The timing decision section 128 decides whether or not the player character is intercepted in the visual field as looked from the visual point position. This decision is made based on the visual point position set by the visual point setting section 122 and the detailed shape (particularly the vertex coordinates) of the player character or other object calculated by the game space setting section 124.

The timer 130 is started when a decision is made that the player character is intercepted in the visual field by the timing decision section 128, and outputs a time-up notice after the elapse of a predetermined time. In this embodiment, if the player character is intercepted in the visual field, the visual point position is shifted in a predetermined time after an image of the player character disappears from the display screen, to detour around an obstruction placed between the original visual point position and the player character. The timer 130 measures a fixed time until the movement of this visual point position is started.

The controller 300 corresponds to movement instructing unit and return instructing unit; the game space setting section 124 corresponds to space setting unit; the image generating section 180 corresponds to image generating unit; the timing decision section 128 corresponds to timing decision unit; and the visual point position setting section 122 corresponds to visual point position setting unit.

The game machine of this embodiment has such a configuration, and the operation of the game machine will be described below.

Figure 3:
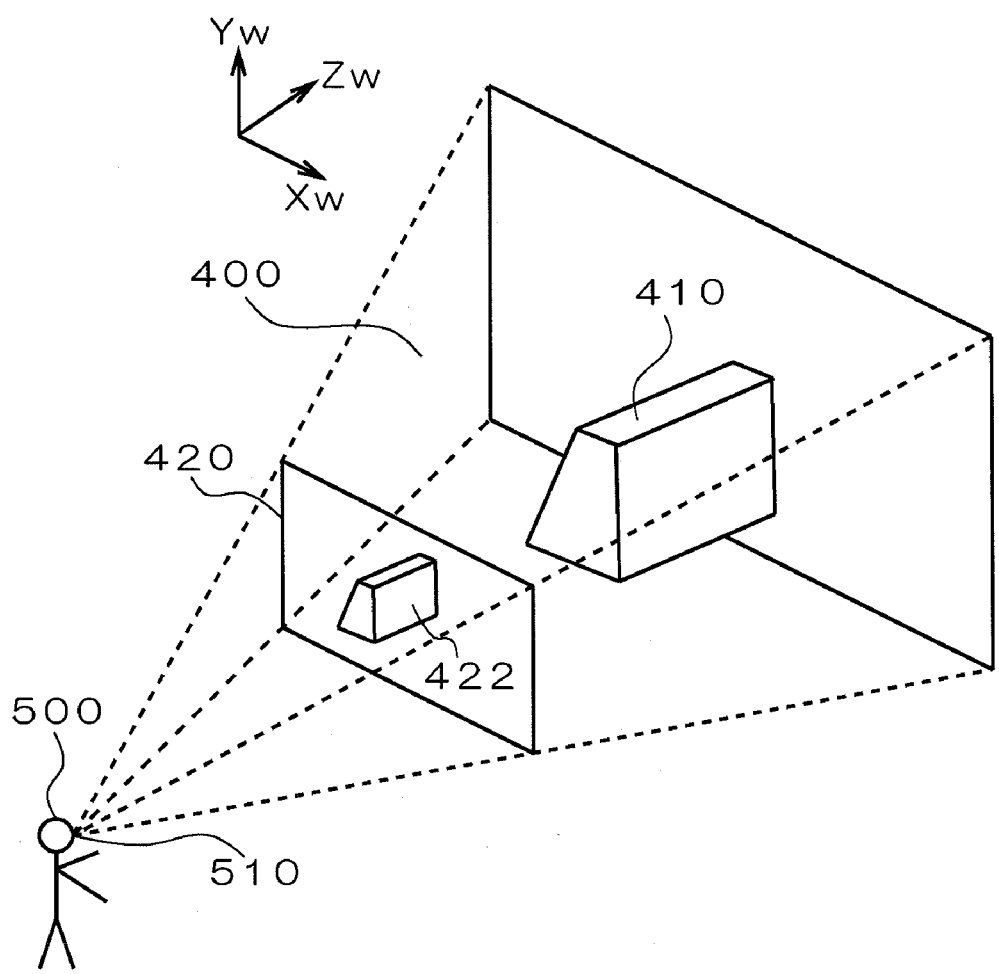
FIG. 3 is a view illustrating a principle for generating a game image.

To begin with, a principle of creating a game image will be described below. FIG. 3 is a view illustrating the principle of a game image creation. The game operation section 110 has a three-dimensional object 410, for example, representing an obstacle, within a three-dimensional game space 400. The CD-ROM 190 stores the data for a plurality of polygons making up this three-dimensional object 410, and the data of texture appended to the plurality of polygons. Within the three-dimensional game space 400, not only the three-dimensional object 410 representing the obstacle, but also other various sorts of three-dimensional objects are disposed. The data for a plurality of polygons making up these three-dimensional objects and the data of texture appended to the plurality of polygons are stored in the CD-ROM 190.

The image generation section 180 appends a corresponding texture to a polygon making up the three-dimensional object. The three-dimensional object 410 made up of the polygon with the texture appended is subjected to perspective projection conversion onto a perspective projection plane in a visual point coordinate system centered at a virtual visual point position 510 of a player 500 that is set by the visual point position setting section 122, and displayed as a pseudo three-dimensional image 422 on the display section 210 of the television monitor device 200.

Also, if the controller 300 is operated by the player 500, the player character is moved, and the visual point position or the visual field direction is changed. Thereby, the game operation section 110 changes the position or orientation of the three-dimensional object 410 or other three-dimensional object within the three-dimensional game space 400, corresponding to a new visual point position or visual field direction. And for the three-dimensional object with the position or orientation changed, the image generating section 180 performs the perspective projection conversion onto the perspective projection plane 420 in the visual point coordinate system centered at the visual point position 510 of the player 500, to generate a game image with the updated contents.

For example, in employing a method of computer graphics, the game operation section 110 creates a configuration model of the three-dimensional object 410, using an independent body coordinate system. That is, using the body coordinate system, each polygon making up the three-dimensional object 410 is arranged to specify the configuration model of the three-dimensional object 410. Also, the game operation section 110 constructs the three-dimensional game space 400, using a world coordinate system (Xw, Yw, Zw), and arranges the three-dimensional object 410 represented using the body coordinate system in the world coordinate system in accordance with its configuration model. The image generating section 180 performs the perspective projection conversion by converting the coordinates of each three-dimensional object within the three-dimensional game space 400 into a visual point coordinate system having an origin at the visual point position 510, and a gaze direction along the positive direction of the Z axis, and further into a screen coordinate system that is a coordinate system for the perspective projection plane 420. In this way, an image in the three-dimensional game space 400 falling within a range of the visual field from the visual point position 510 is displayed on the display section 210 of the television monitor device 200.

Figure 4:
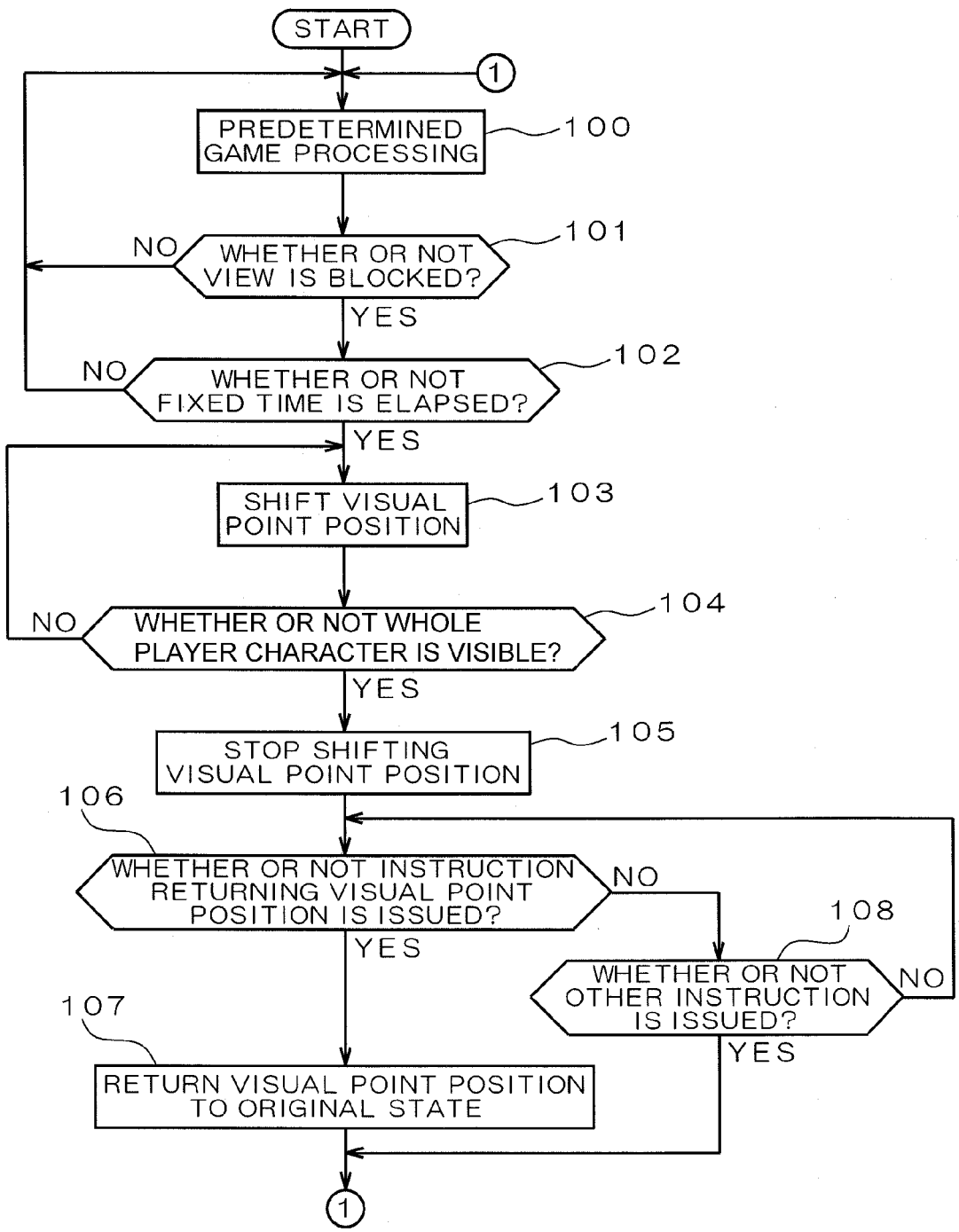
FIG. 4 is a flowchart showing an operation procedure of the game machine according to the first embodiment of the invention.

An operation of the game machine in this embodiment will be described below. FIG. 4 is a flowchart showing an operation procedure of the game machine in this embodiment, principally showing the movement of the player character and the operation procedure taken when the player character is hidden behind somewhat obstruction during the movement.

If a game start is instructed via the controller 300, the game processing section 120 performs a predetermined game processing including generating an event under predetermined conditions or making a combat process when encountered with an enemy character on the basis of a program read from the CD-ROM 190 (step 100).

Then, the timing decision section 128 decides whether or not the player character is intercepted in the visual field by an object such as a mountain disposed within the game space as looked from the visual point position (step 101). If the player character is not intercepted in the visual field, a negative decision is made, and the procedure returns to step 100 to continue the predetermined game processing.

If the player character is intercepted in the visual field, an affirmative decision is made at step 101, and the timing decision section 128 notifies the affirmative decision to the timer 130. The timer 130 starts measuring a fixed time, upon receiving a notice from the timing decision section 128, and outputs a time-up notice after the elapse of the fixed time. The visual point position setting section 122 determines whether or not the fixed time has elapsed by checking to see whether the time-up notice is output from the timer 130 (step 102). While the fixed time has not elapsed, a negative decision is made at step 102, whereby the processing following step 100 is repeated.

If the fixed time has elapsed since the player character is intercepted in the visual field, the visual point position setting section 122 shifts the visual point position to detour around the obstruction existing between the current visual point position and the player character (step 103). Then it is determined whether or not the player character is seen as a whole (step 104). While the player character is not seen as a whole, a negative decision is made at step 104, whereby the visual point position setting section 122 continues the shift process of the visual point position as shown at step 103. The details of the shift process of the visual point position by the visual point position setting section 122 will be described below.

If the player character is visible entirely, an affirmative decision is made at step 104, and then the shift process of the visual point position is stopped by the visual point position setting section 122 (step 105).

Then, the visual point position setting section 122 determines whether or not it is instructed to return the visual point position to an original position before shift (step 106). Specifically, in this embodiment, the player can instruct to return the visual point position to the original position by a simple operation of pressing the left key 322 or the right key 324 of the controller 300.

In the case where an instruction of returning the visual point position is issued, an affirmative decision is made at step 106, and then the visual point position setting section 122 sets the visual point position at the original position before movement (step 107). Thereafter, the procedure returns to step 100 to continue the same processing as above.

If no instruction of returning the visual point position (visual point position returning instruction) is issued, a negative decision is made at step 106, and then the game processing section 120 determines whether or not other instruction is issued by operating the controller 300 (step 108). While the other instruction is not issued, the procedure returns to step 106 to repeat the processing following step 106 for determining whether or not an instruction of returning the visual point position is issued. Also, if the other instruction is issued, an affirmative decision is made at step 108, and then the game processing section 120 returns to step 100 to effect a game process corresponding to the content of a pressed key. Specifically, if any direction of the cross cursor key 310 is pressed, the player character is moved in the corresponding direction.

Then the shift process of the visual point position by the visual point position setting section 122 will be described below in detail. FIGS. 5 to 8 are typical views illustrating the shift process of the visual point position that is performed by the visual point position setting section 122.

Figure 5A:
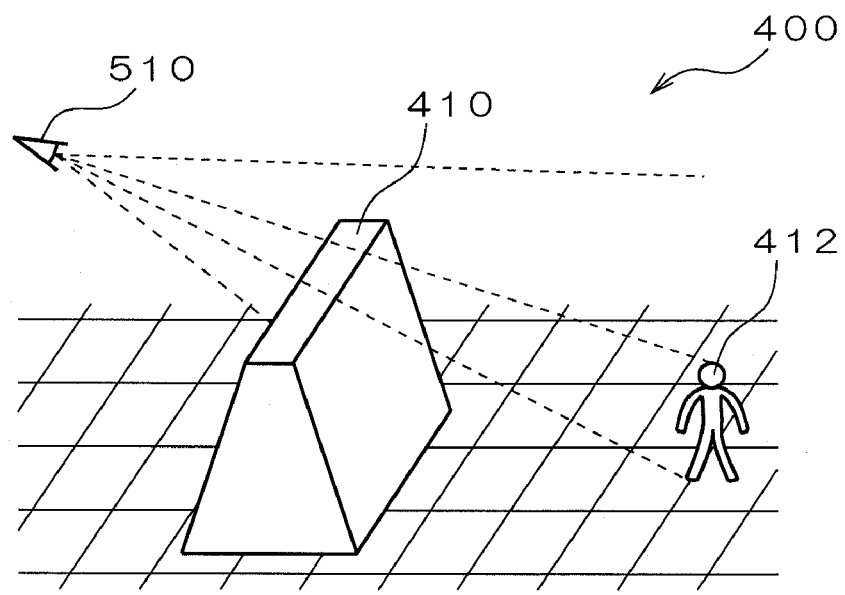
FIGS. 5A and 5B are typical views for explaining a process of shifting a visual point position that is performed by a visual point position setting section.
Figure 5B:
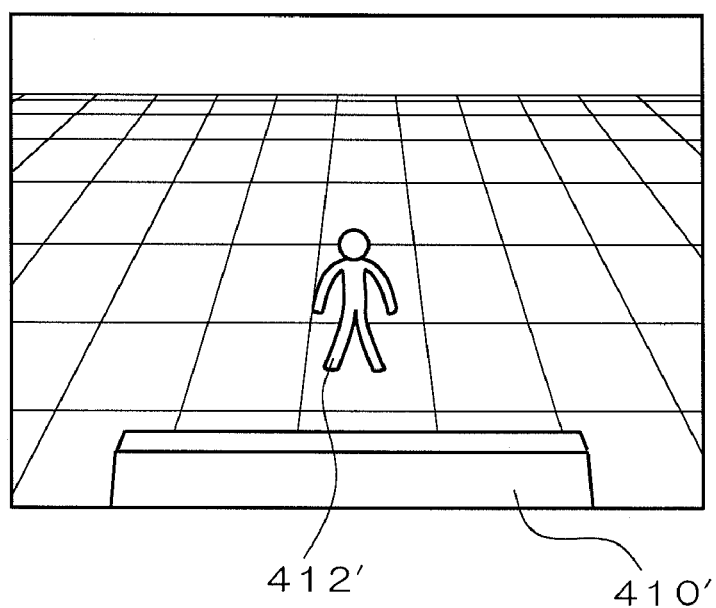

FIG. 5 is a view for explaining an instance where the player character 412 is not intercepted in the visual field by the three-dimensional object 410 as the obstruction as looked from the visual point position 510. FIG. 5A shows a positional relation between the three-dimensional object 410 and the player character 412 and the visual point position 510 within the three-dimensional game space 400, and FIG. 5B shows a display image example. In the case where the player character 412 and the three-dimensional object 410 are disposed apart from each other as shown in FIG. 5A, the visual point position setting section 122 does not perform the shift process of the visual point position, because a player character image 412' is not intercepted by a three-dimensional object image 410' on the display screen as shown in FIG. 5B.

Figure 6A:
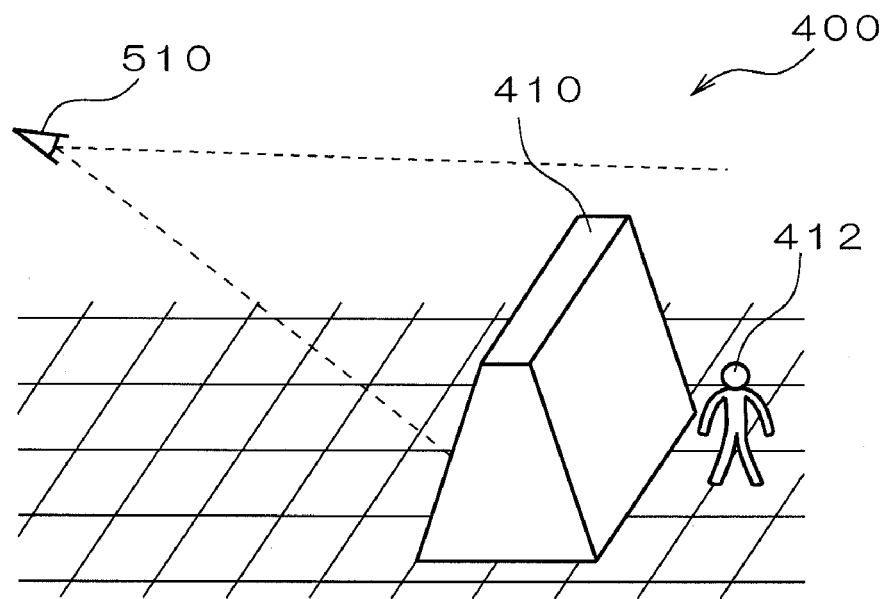
FIGS. 6A and 6B are typical views for explaining a process of shifting the visual point position that is performed by the visual point position setting section.
Figure 6B:
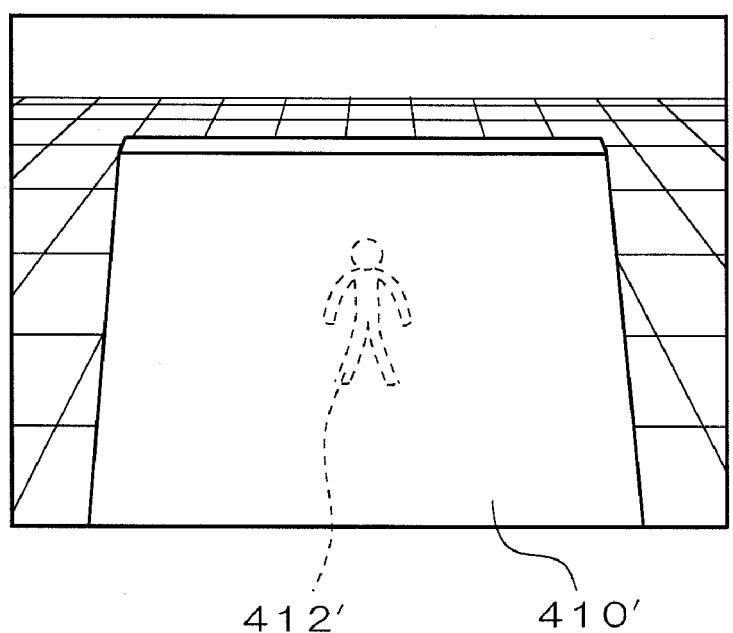

In the case where the player character 412 is located close to the three-dimensional object 410, and thus intercepted in the visual field as looked from the visual point position 510 as shown in FIG. 6A, a player character image 412' is intercepted by a three-dimensional object image 410' and disappears from the display screen in a display example as shown in FIG. 6B. The shift process of the visual point position by the visual point position setting section 122 is started in a fixed time after the player character 412 is intercepted in the visual field as described above.

Figure 7:
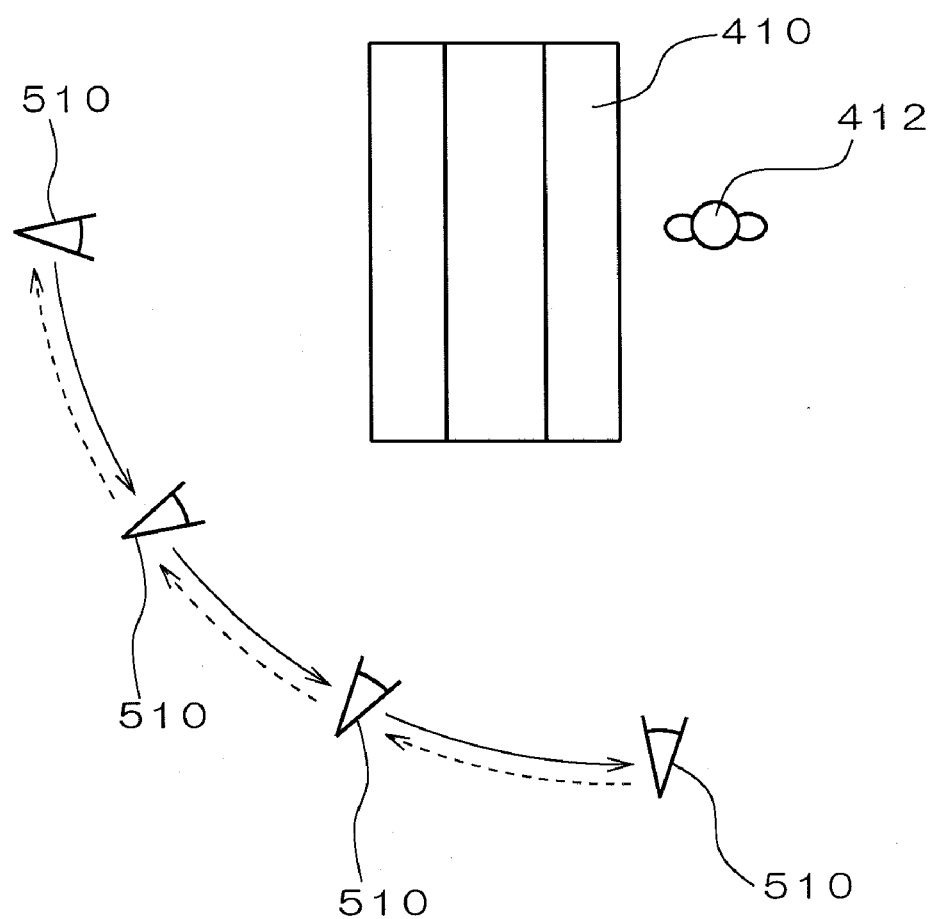
FIG. 7 is a typical view for explaining a process of shifting the visual point position that is performed by the visual point position setting section.

FIG. 7 is a view showing the player character 412 and the three-dimensional object 410 as shown in FIG. 6A as looked from right above. As indicated by the arrows in FIG. 7, the visual point position setting section 122 perform the process of shifting the visual point position 510 to detour around the three-dimensional object 410 existing between the original visual point position and the player character 412, and stops the shift of the visual point position 510 at a place where the player character 412 can be seen as a whole as described above.

Figure 8A:
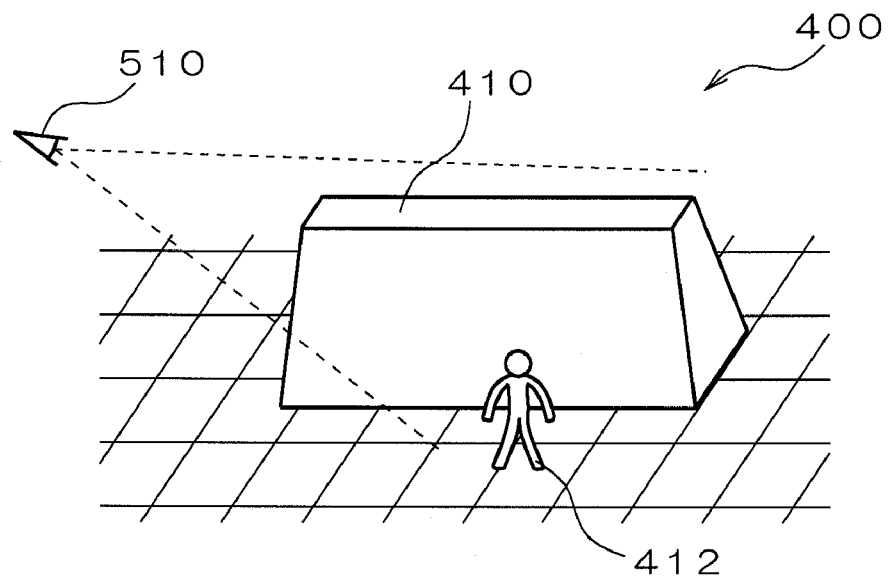
FIGS. 8A and 8B are typical views for explaining a process of shifting the visual point position that is performed by the visual point position setting section.
Figure 8B:
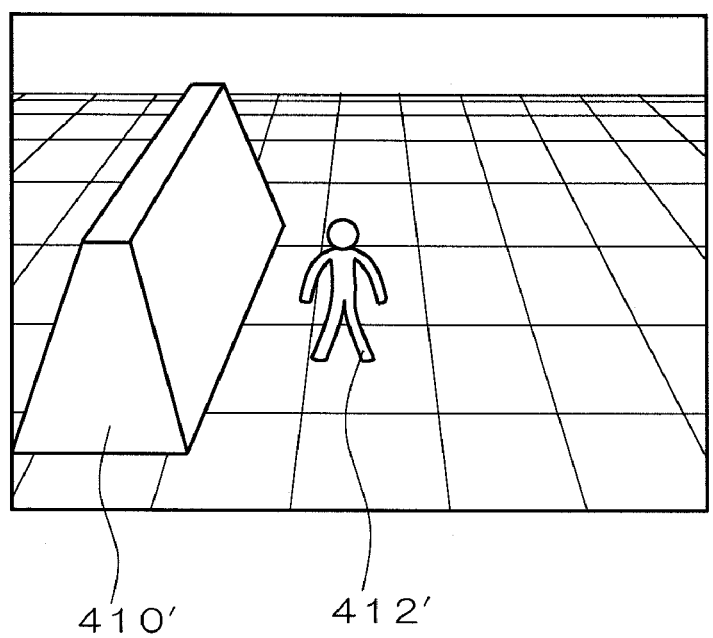

In this way, if the visual point position is shifted by the visual point position setting section 122, the player character 412 and the three-dimensional object 410 are placed in a positional relation with respect to the visual point position 510 as shown in FIG. 8A, and the player character image 412' can appear as a whole in a display example as shown in FIG. 8B. If an instruction of returning the visual point is issued, the visual point position 510 is reset to an original position as indicated by the arrows of the dotted line in FIG. 7. As a result, a previous image is displayed again on the screen in which the player character image 412' is intercepted by the three-dimensional object image 410' and disappears from the display screen, as shown in FIG. 6B.

Figure 9:
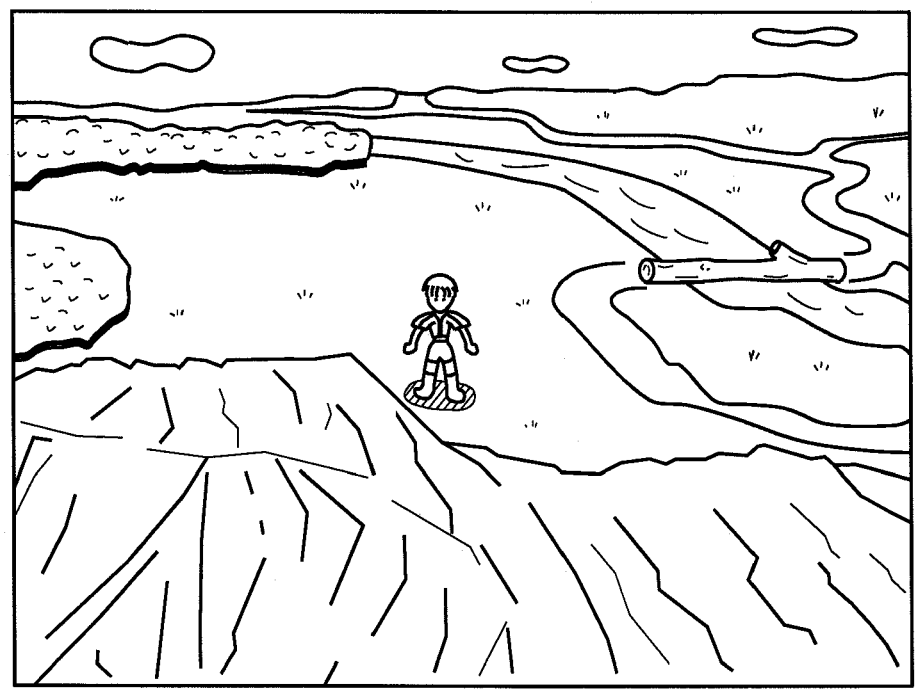
FIG. 9 is a view illustrating a display example of an actual game image.
Figure 10:
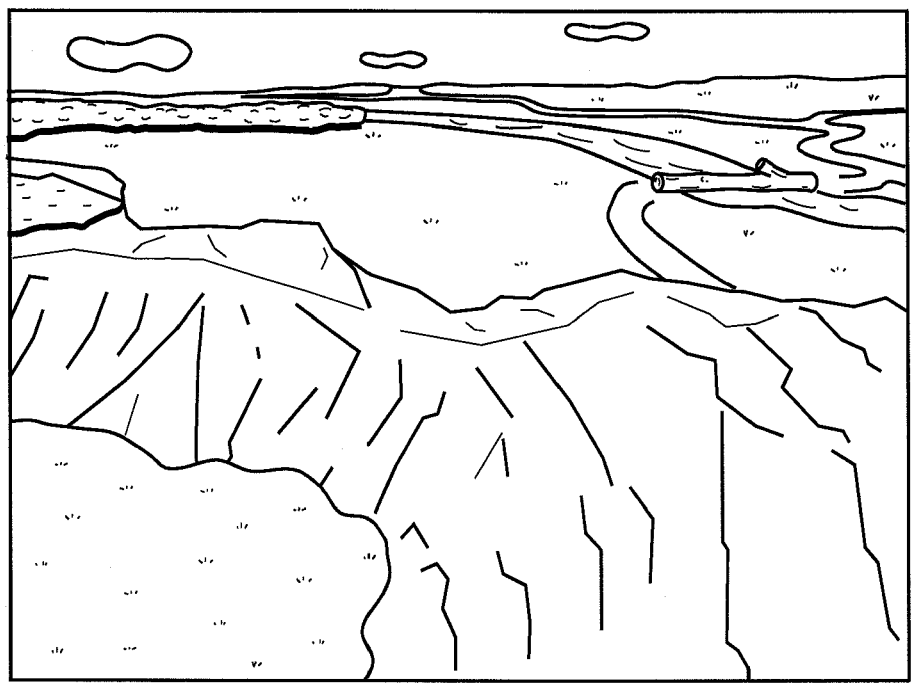
FIG. 10 is a view illustrating a display example of the actual game image.

FIGS. 9 to 13 are views showing the display examples of actual game images. The player character is moving within the game space where there are mountain, river and grassy land. In a game image as shown in FIG. 9, a player character image is displayed almost in the center of the screen, and a mountain image is displayed on the fore side of the player character (on the lower side of the figure). In this instance, the player character and the mountain on the fore side has a positional relation with respect to the visual point position as shown in FIG. 5 described above, in which the player character is not intercepted in the visual field.

Herein, if an operation instruction is given by the player, to move the player character to the fore side, the player character and the mountain on the fore side has a positional relation with respect to the visual point position, as shown in FIG. 6 described above. In this instance, the mountain on the fore side becomes an obstruction for intercepting the player character in the visual field, so that the player character image disappears from the display screen.

Figure 11:
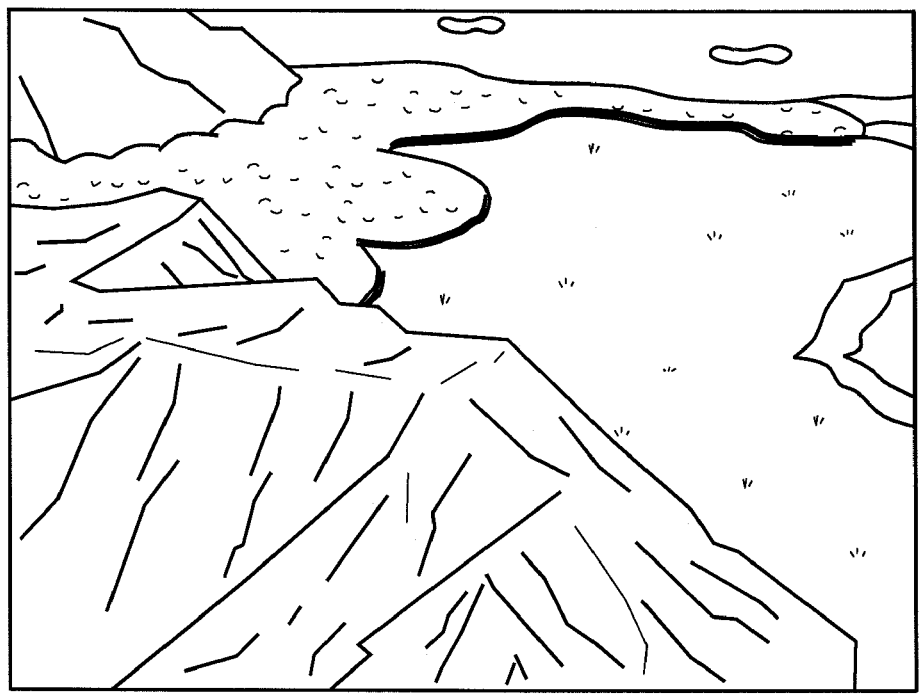
FIG. 11 is a view illustrating a display example of the actual game image.
Figure 12:
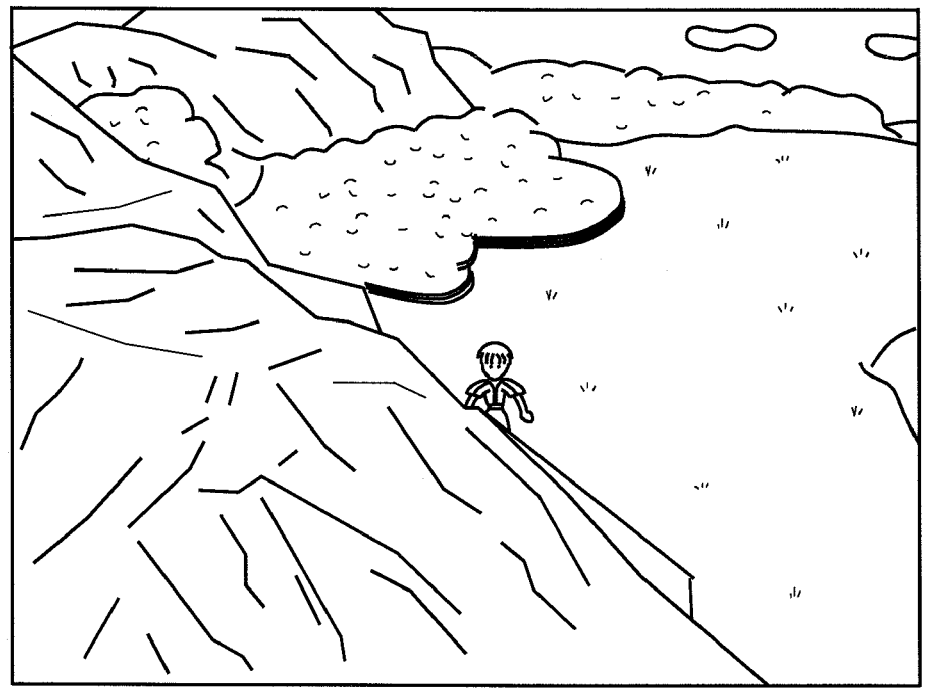
FIG. 12 is a view illustrating a display example of the actual game image.

The shift process of the visual point position is performed in a fixed time after the player character image disappears from the display screen, as shown in FIG. 7 described above. FIGS. 11 and 12 show the display examples of the game image while the visual point position is being shifted. As shown in FIG. 11, the continuously changing image represents how to detour around the mountain on the fore side rightward while shifting the visual point position. By further shifting the visual point position, a part of the player character image will appear on the opposite side of the mountain image, as shown in FIG. 12.

Figure 13:
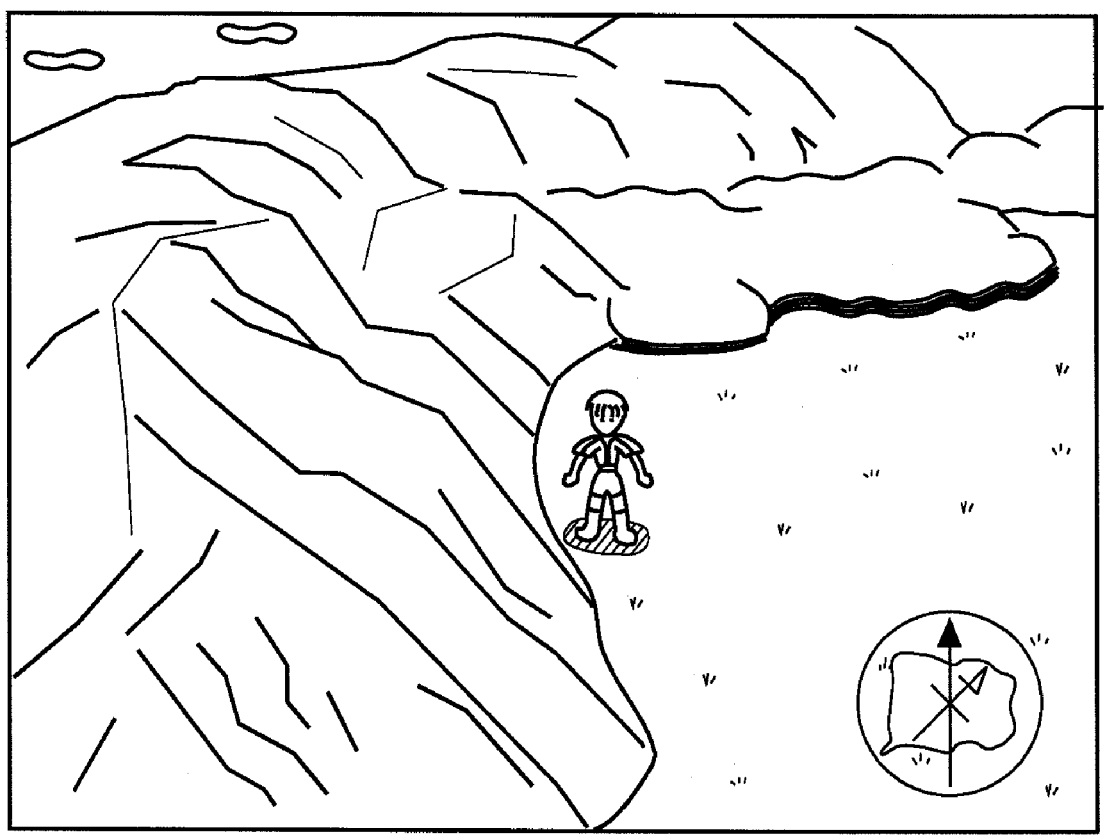
FIG. 13 is a view illustrating a display example of the actual game image.

At a position where the player character image can be seen as a whole, as shown in FIG. 13, the shift process of the visual point position is completed. If an instruction of returning the visual point is issued, the visual point position is returned to the original state, and the game image is displayed in the order of FIG. 12, FIG. 11 and FIG. 10.

In this embodiment, when the player character is intercepted in the visual field, the shift process of the visual point position is performed after the timer 130 measures the fixed time. Hence, the unnecessary shift of the visual point can be avoided, and the display contents can be grasped more easily. Since the movement of the player character can be continuously instructed while maintaining the visual field direction unchanged, the operability can be increased.

Second Embodiment

In the first embodiment as described above, in the case where the player character is intercepted in the visual field by the object such as the mountain within the game space, as looked from the visual point position, the shift process of the visual point position is automatically made after the elapse of a fixed time. However, the shift process of the visual point position may be effected only when a predetermined key of the controller 300 is pressed.

Figure 14:
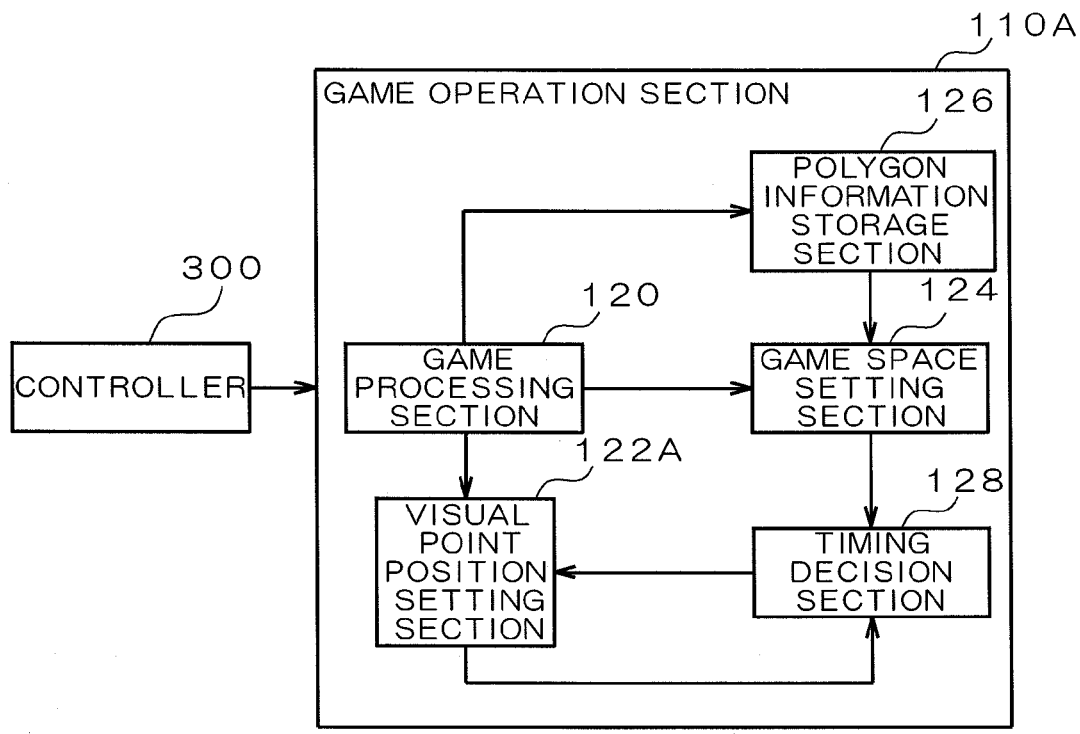
FIG. 14 is a block diagram partly showing a configuration of a game machine according to a second embodiment of the invention.
Figure 15:
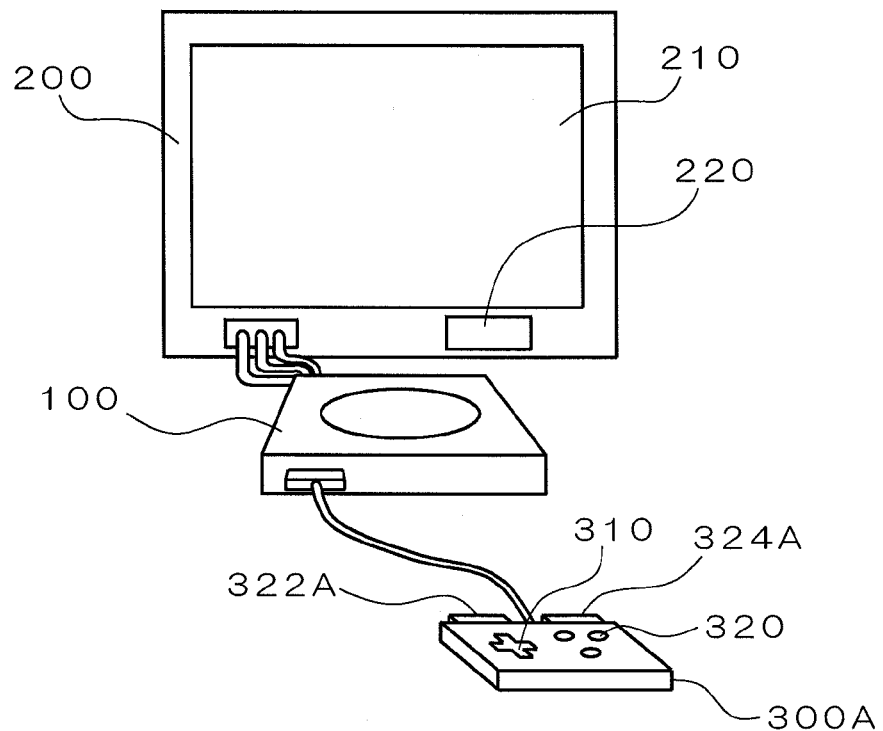
FIG. 15 is a view illustrating how the game machine and a peripheral device are connected in the second embodiment.

FIG. 14 is a block diagram showing partly the configuration of a game machine according to a second embodiment of the invention. FIG. 15 is a view showing how the game machine and a peripheral device are connected in the second embodiment. This game machine according to the second embodiment has fundamentally the same configuration as the game machine according to the first embodiment as described previously, except for the internal configuration of a game operation section 110A and the functions of a left key 322A and a right key 324A equipped on a controller 300A. The identical parts are not described in detail.

As shown in FIG. 14, the game operation section 110A of the second embodiment comprises a game processing section 120, a visual point position setting section 122A, a game space setting section 124, a polygon information storage section 126, and a timing decision section 128. These sections of the game operation section 110A operate in the same way as those of the game operation section 110 in the first embodiment as described previously, except for the visual point position setting section 122A, and are not described in detail.

The visual point position setting section 122A sets the visual point position required to generate a two-dimensional game image in the image generating section 180 along with the movement status of the player character located within the three-dimensional game space. For example, if the movement of the player character is instructed by the player manipulating the cross cursor key 310 of the controller 300, the visual point position is automatically shifted while maintaining a relative positional relation with the player character so that the player character is not out of the display screen.

Also, the visual point position setting section 122A performs an operation of detouring around the obstruction existing between the original visual point position and the player character by shifting the visual point position, if the player enters an instruction of making the shift process of the visual point position via the controller 300, in the case where the timing decision section 128 decides that the player character is intercepted in the visual field as looked from the visual point position and outputs a notice for that. In this embodiment, if the left key 322A of the controller 300 is pressed, the shift process of the visual point position is performed. Also, if the right key 324A is pressed, an operation of returning the visual point position after shift to the original position is performed in the same manner as in the first embodiment.

Accordingly, in the case where the player character is intercepted in the visual field as looked from the visual point position, the player can effect the shift process of the visual point position at a desired timing by pressing the left key 322A, and return the visual point position to the original position at a desired timing by pressing the right key 324A.

Figure 16:
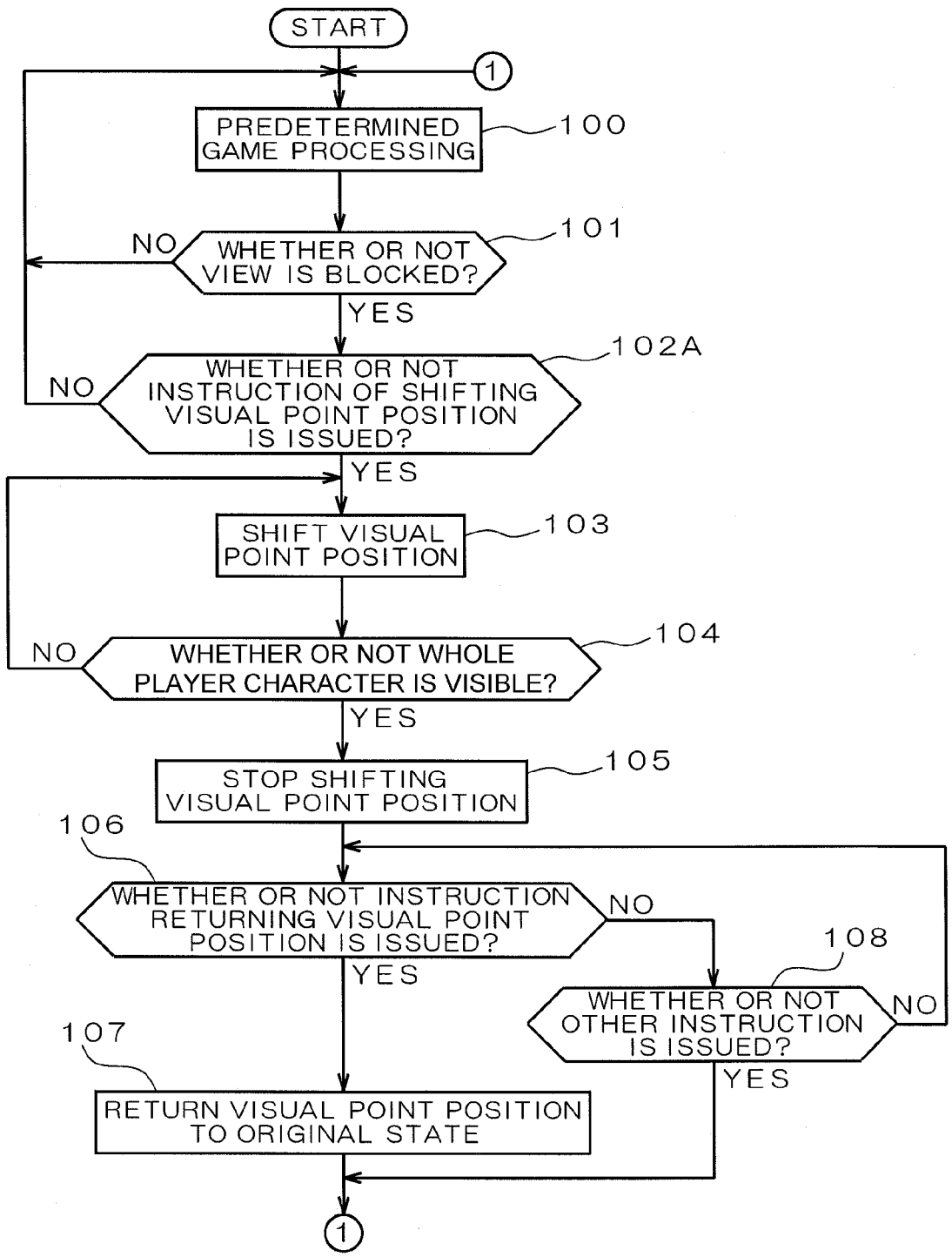
FIG. 16 is a flowchart showing an operation procedure of the game machine in the second embodiment.

FIG. 16 is a flowchart showing an operation procedure of the game machine according to the second embodiment, principally showing the movement of the player character and the operation procedure taken when the player character is hidden behind somewhat obstruction during the movement. The operation procedure as shown in FIG. 16 includes a step 102A as shown in FIG. 16, which replaces the operation of step 102 contained in the operation procedure of the first embodiment as described above and shown in FIG. 4, and will be described below by paying attention to this change point.

In the case where the player character is intercepted in the visual field by the object such as the mountain within the game space as looked from the visual point position, the timing decision section 128 makes a notice to the visual point position setting section 122A that the player character is intercepted.

The visual point position setting section 122 that receives the notice determines whether or not an instruction of shifting the visual point position (visual point shift instruction) is issued by pressing the left key 322A of the controller 300 (step 102A). If the visual point shift instruction is not issued, a negative decision is made at step 102A, and the procedure returns to step 100, whereby the processing following the step 100 is repeated.

Also, in the case where the visual point shift instruction is issued, an affirmative decision is made at step 102A, and the visual point position setting section 122A shifts the visual point position to detour around the obstruction existing between the current visual point position and the player character (step 103). Then it is determined whether or not the player character is seen as a whole (step 104). While the player character is not seen as a whole, a negative decision is made at step 104, whereby the visual point position setting section 122 continues the shift process of the visual point position as shown at step 103. The details of the shift process of the visual point position by the visual point position setting section 122 has been already described in FIGS. 5 to 8.

In this way, the visual point is not shifted immediately when the player character and the object (obstruction) satisfy a predetermined relation, but shifted only when the left key 322A of the controller 300 is pressed by the player. Accordingly, the unnecessary shift of the visual point can be avoided in the case where the player character and the object satisfy the predetermined relation only in a moment, and the display contents can be grasped more easily. Since the movement of the player character can be continuously instructed while maintaining the visual field direction unchanged, the operability can be increased.

Third Embodiment

In the second embodiment, the shift process of the visual point position is performed only if a predetermined key of the controller 300 is pressed. However, the shift process of the visual point position may be automatically performed in such a manner that the visual point position is shifted slowly at first and then faster with the elapse of the time, immediately after the player character is intercepted in the visual field by the object such as the mountain within the game space as looked from the visual point position.

Figure 17:
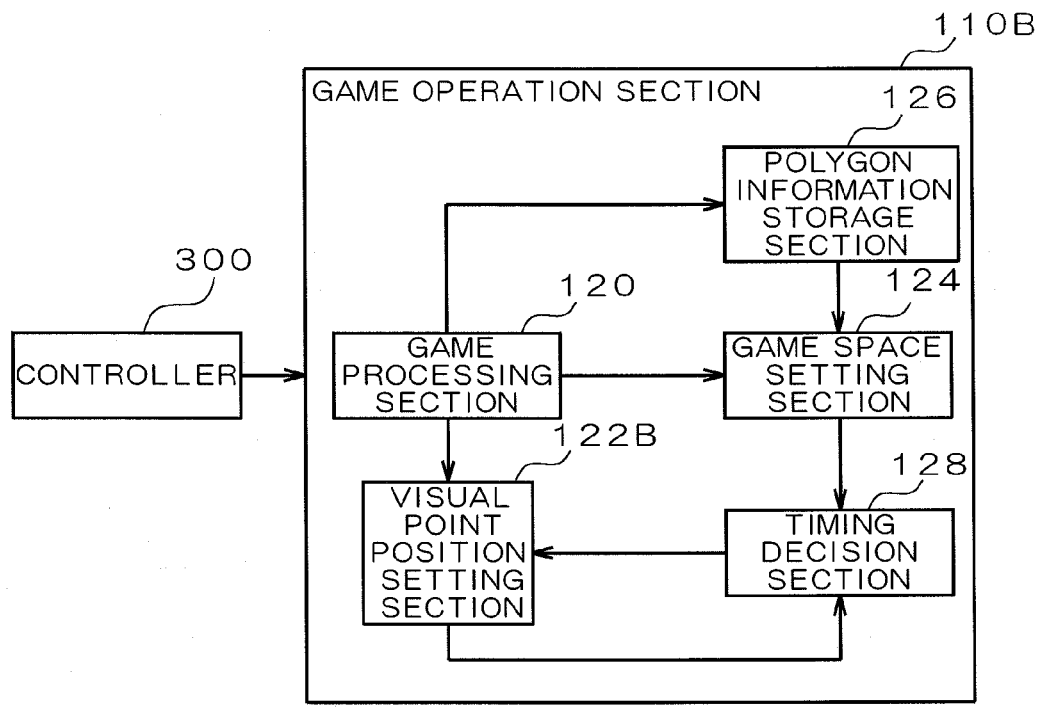
FIG. 17 is a block diagram partly showing a configuration of a game machine according to a third embodiment of the invention.

FIG. 17 is a block diagram showing partly the configuration of a game machine according to a third embodiment of the invention. This game machine according to the third embodiment has fundamentally the same configuration as the game machine according to the first embodiment as described previously, except for the internal configuration of a game operation section 110B. The identical parts are not described in detail. As shown in FIG. 17, the game operation section 110B of the third embodiment comprises a game processing section 120, a visual point position setting section 122B, a game space setting section 124, a polygon information storage section 126, and a timing decision section 128. These sections of the game operation 110B operate in the same way as those of the game operation section 110 in the first embodiment as described previously, except for the visual point position setting section 122B, and are not described in detail.

The visual point position setting section 122B sets the visual point position required to generate a two-dimensional game image in the image generating section 180 along with the movement status of the player character located within the three-dimensional game space. Also, the visual point position setting section 122B performs an operation of detouring around the obstruction existing between the original visual point position and the player character by shifting the visual point position, in the case where the timing decision section 128 decides that the player character is intercepted in the visual field as looked from the visual point position and outputs a notice for that. In making the shift process of the visual point position, the visual point position setting section 122B shifts the visual point position slowly at first and then faster with the elapse of the time, as described above.

In this embodiment, if the left key 322 or right key 324 of the controller 300 is pressed, the visual point position setting section 122B returns the visual point position after shift to the original position in the same manner as in the first embodiment.

Figure 18:
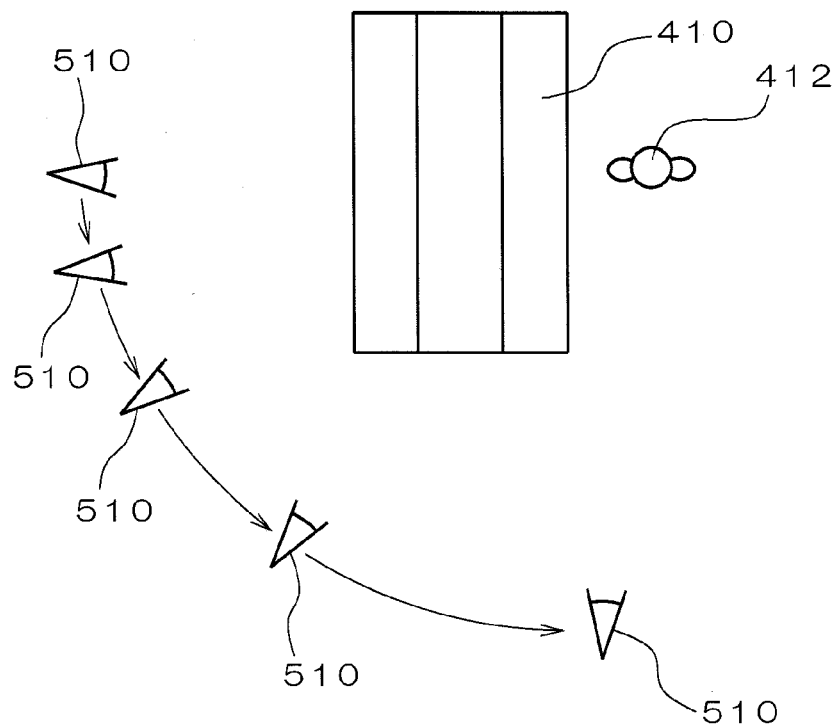
FIG. 18 is a view for explaining a process for shifting the visual point position slowly at first, and then faster with an elapse of the time.

FIG. 18 is a view for explaining the shift process of shifting the visual point position slowly at first and then faster with the elapse of the time, in which the player character 412 and the three-dimensional object 410 are looked from right above in the same manner as shown in FIG. 7 described above. As shown in FIG. 18, in performing the shift process of shifting the visual point position 510 to detour around the three-dimensional object 410 existing between the original visual point position and the player character 412, the visual point position setting section 122B increases the shift amount of the visual point position per unit time small at first and then gradually larger.

Figure 19:
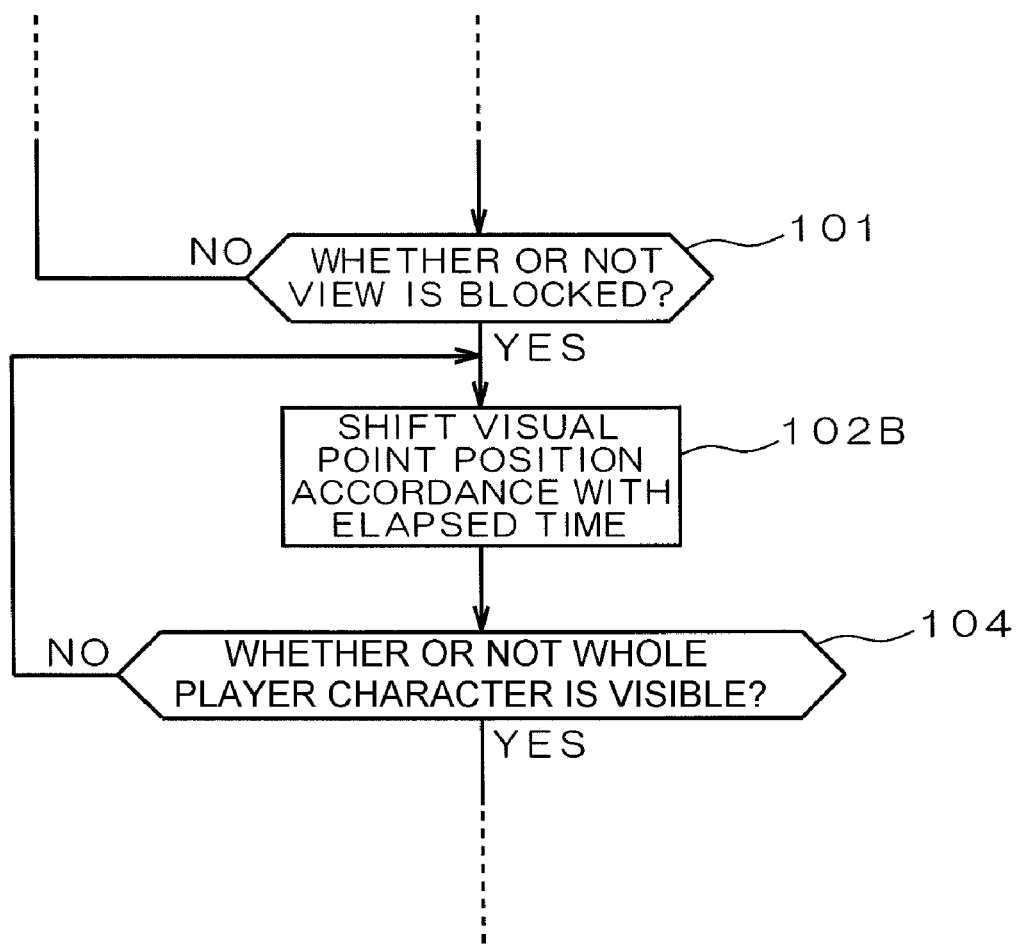
FIG. 19 is a flowchart showing an operation procedure of the third embodiment.

FIG. 19 is a flowchart showing an operation procedure of the game machine according to the third embodiment, only partly showing a procedure section different from the flowchart as shown in FIG. 4. That is, the flowchart as shown in FIG. 19 has a step 102B that replaces the steps 102 to 103 contained in the operation procedure of the first embodiment as described previously and shown in FIG. 4, and will be described below by paying attention to this change point.

In the case where the player character is intercepted in the visual field, an affirmative decision is made at step 101, and the timing decision section 128 makes a notice to the visual point position setting section 122B that the player character is intercepted. The visual point position setting section 122B that receives the notice performs the shift process of the visual point position in accordance with the elapsed time since reception of the notice (step 102B). Then it is determined whether or not the player character is seen as a whole (step 104). While the player character is not seen as a whole, a negative decision is made at step 104, whereby the visual point position setting section 122B continues the shift process of the visual point position as shown at step 102B.

In this way, since the visual point is not shifted immediately when the player character and the object (obstruction) satisfy a predetermined relation, but shifted slowly at first, the visual point is hardly shifted, when the predetermined relation is satisfied only in a moment, whereby the display contents can be grasped more easily. Since the movement of the player character can be continuously instructed while maintaining the visual field direction unchanged, the operability can be increased.

Fourth Embodiment

By the way, in the first to third embodiments, the shift process of the visual point position is performed only if the player character is intercepted in the visual field by the object such as the mountain within the game space as looked from the visual point position, so that the player character appears on the display screen to allow the position of the player character to be grasped more easily. However, a transmission process may be performed for an object shielding the field of view.

Figure 20:
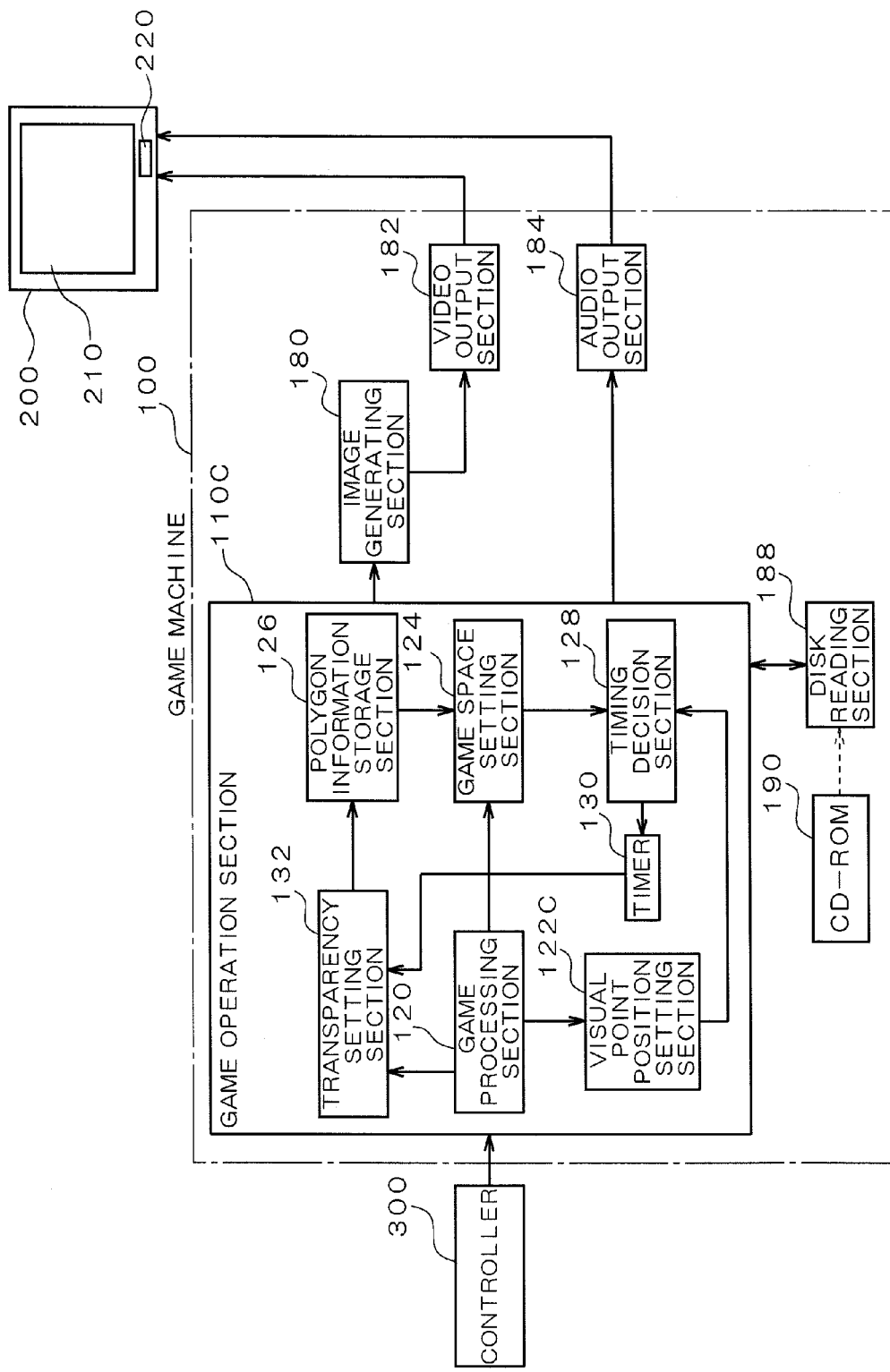
FIG. 20 is a block diagram showing a configuration of a main unit of a game machine according to a fourth embodiment of the invention.

FIG. 20 is a block diagram showing the configuration of a game machine 100 according to a fourth embodiment of the invention. This game machine according to the fourth embodiment has fundamentally the same configuration as the game machine according to the first embodiment as described previously, except for the internal configuration of a game operation section 110C. The identical parts are not described in detail. As shown in FIG. 20, the game operation section 110C of the fourth embodiment comprises a game processing section 120, a visual point position setting section 122C, a game space setting section 124, a polygon information storage section 126, a timing decision section 128, a timer 130, and a transparency setting section 132. The different points from the former embodiments will be described below in detail.

The visual point position setting section 122C sets the visual point position required to generate a two-dimensional game image in the image generating section 180 along with the movement status of the player character located within the three-dimensional game space. Note that the visual point position setting section 122C of this embodiment is different in operation from the visual point position setting section 122, 122A, 122B as described previously in the respect that the shift process of the visual point position is not performed.

The timing decision section 128 decides whether or not the player character is intercepted in the visual field as looked from the visual point position. The timer 130 is started when the timing decision section 128 makes a decision that the player character is intercepted in the visual field, and outputs a time-up notice after the elapse of a fixed time. In this embodiment, a transmission process of making transparent the obstruction existing between the visual point position and the player character with the contour left behind is performed, after the elapse of a fixed time since the player character is intercepted in the visual field and an image of the player character disappears from the display screen. The timer 130 measures the fixed time until this transmission process is initiated.

The transparency setting section 132 sets the value of transparency (transparent degree) of a polygon corresponding to a three-dimensional object as the obstruction existing between the visual point position and the player character. By increasing or decreasing this value of transparency, the visibility of a texture mapped onto this polygon can be varied. For example, in this embodiment, the transparency has a value of 0 to 100%, in which when the transparency is 0%, the polygon is opaque, that: is, an object placed behind this polygon is entirely invisible, and when the transparency is 100%, the polygon is transparent, that is, the polygon is transparent with its contour only left and the object placed behind can be entirely seen.

Accordingly, when if the timer 130 outputs a time-up notice, the transparency setting section 132 sets the transparency of the polygon corresponding to the three-dimensional object as the obstruction at 100%, and the set value of transparency is stored in the polygon information storage section 126. And a game image in view of the set value of transparency is generated by the image generating section 180. The three-dimensional object as the obstruction becomes transparent to allow the player character located behind to be seen, for example, by changing the transparency of texture corresponding to each polygon on the basis of the value of transparency set corresponding to each polygon.

Also, the transparency setting section 132 resets the transparency of the polygon corresponding to the three-dimensional object as the obstruction at an original value (0%), when a predetermined key of the controller 300 is pressed. Specifically, in this embodiment, when the left key 322 or right key 324 of the controller 300 is pressed, the transparency setting section 132 resets the transparency to the original value. Thereby, the transparent state is released.

The controller 300 corresponds to movement instructing unit and return instructing unit; the game space setting section 124 corresponds to space setting unit; the image generating section 180 corresponds to image generating unit; the timing decision section 128 corresponds to timing decision unit; the visual point position setting section 122 corresponds to visual point position setting unit; and the transparency setting section 132 corresponds to transparency processing unit.

Figure 21:
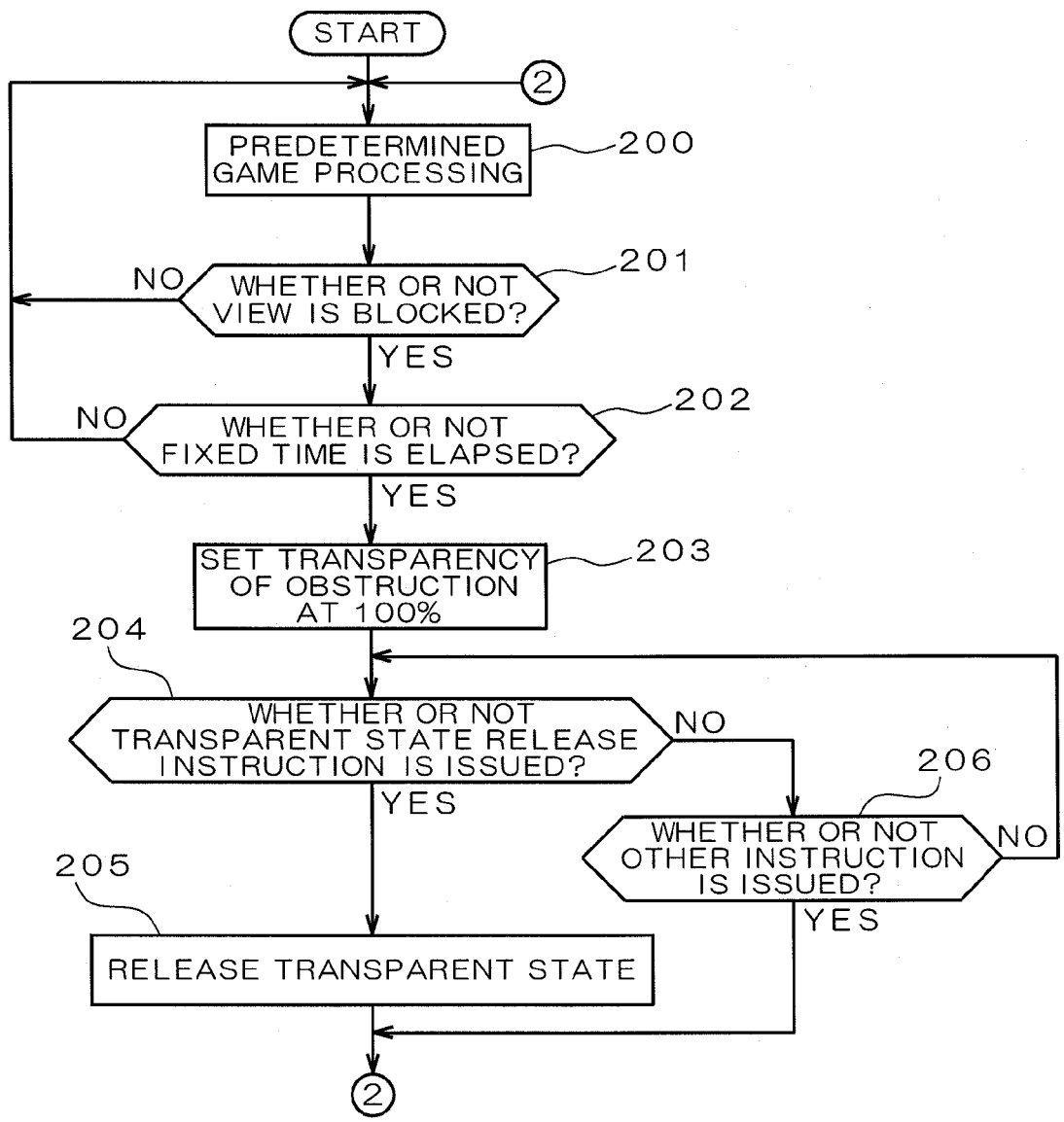
FIG. 21 is a flowchart showing an operation procedure of the game machine in the fourth embodiment.

An operation of the game machine in this embodiment will be described below. FIG. 21 is a flowchart showing an operation procedure of the game machine in the fourth embodiment, principally showing the movement of the player character and the operation procedure taken when the player character is hidden behind somewhat obstruction during the movement.

When a game start is instructed via the controller 300, the game processing section 120 performs a predetermined game processing including generating an event under predetermined conditions or making a combat process when the player character is encountered with an enemy character on the basis of a program read from the CD-ROM 190 (step 200).

Then, the timing decision section 128 decides whether or not the player character is intercepted in the visual field by an object such as a mountain disposed within the game space as looked from the visual point position (step 201). If the player character is not intercepted in the visual field, a negative decision is made, and the procedure returns to step 200 to continue the predetermined game processing.

If the player character is intercepted in the visual field, an affirmative decision is made at step 201, and the timing decision section 128 notifies the affirmative decision to the timer 130. The timer 130 starts measuring a fixed time, upon receiving a notice from the timing decision section 128, and outputs a time-up notice after the elapse of the fixed time. The transparency setting section 132 determines whether or not the fixed time has elapsed by checking to see whether or not the time-up notice is output from the timer 130 (step 202). While the fixed time has not elapsed, a negative decision is made at step 202, whereby the processing following the step 200 is repeated.

If the fixed time has elapsed since the player character is intercepted, the transparency setting section 132 sets the transparency of a polygon corresponding to a three-dimensional object as the obstruction existing between the current visual point position and the player character at 100% (step 203). The set transparency may not be necessarily 100%, but may be less than 100% (e.g., 50%) for the transmission process.

The transparency setting section 132 determines whether or not an instruction of releasing the transparent state (transparent state release instruction) is made (step 204). As described above, the player can make an instruction to return the visual point position to the original position by pressing the left key 322 or right key 324 of the controller 300. When the instruction of releasing the transparent state is made, an affirmative decision is made at step 204, wherein the transparency setting section 132 sets the transparency of a polygon corresponding to a three-dimensional object as the obstruction at 0% to release the transparent state (step 205). Thereafter, the procedure returns to step 200, whereby the processing following the step 200 is continued.

If the instruction of releasing the transparent state (transparent state release instruction) is not issued, a negative decision is made at step 204, and then the game processing section 120 determines whether or not the other instruction is issued by operating the controller 300 (step 206). While the other instruction is not made, the procedure returns to step 204, whereby the processing following the step 204 to determine whether or not the transparent state release instruction is issued is repeated. If the other instruction is issued, an affirmative decision is made at step 206, and then the game processing section 120 returns to step 200 to effect a game processing corresponding to the contents of a pressed key.

Figure 22A:
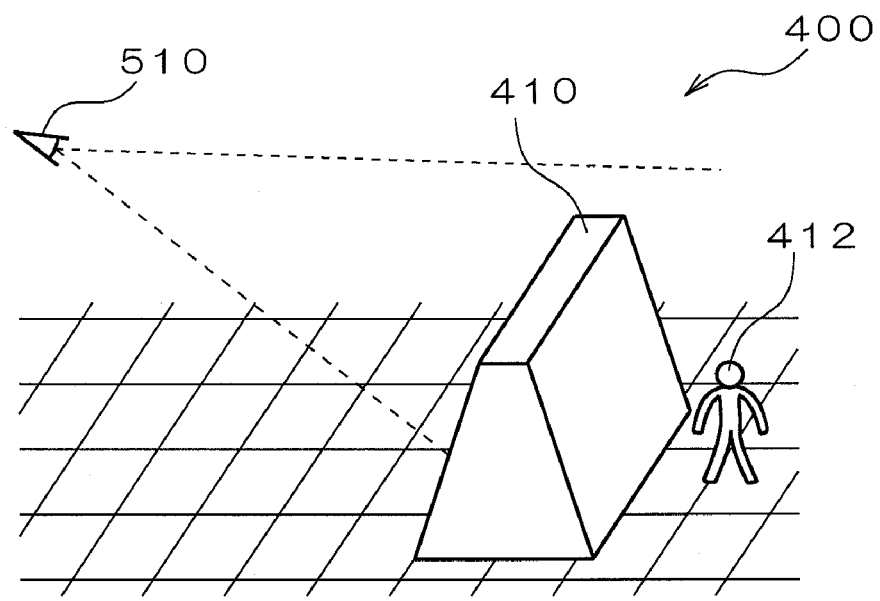
FIGS. 22A and 22B are typical views for explaining a transmission process.
Figure 22B:
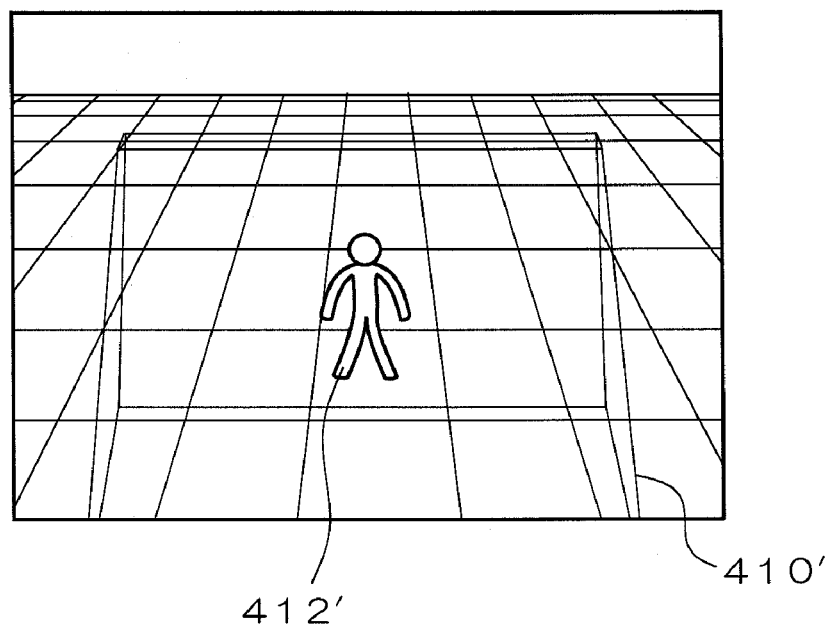

FIG. 22 is a typical view for explaining the transmission process. As shown in FIG. 22A, after the elapse of a fixed time since the player character 412 approaches the three-dimensional object 410 and is intercepted in the visual field as looked from the visual point position 510, the transparency of a polygon corresponding to this three-dimensional object 410 is set to 100% in the same manner as described above in the first embodiment and shown in FIG. 6. As a result, a three-dimensional object image 410' has only its contour left behind, and a player character image 412' and the background image existing behind the three-dimensional object appear in a display example as shown in FIG. 22B.

If the instruction of releasing the transparent state is issued, the player character image 412' is hidden behind the three-dimensional object image 410' in the display example as described above and shown in FIG. 6B.

In this way, the transmission process for the object is not performed immediately when the player character and the object (obstruction) satisfy a predetermined relation, but performed after the timer 130 measures a fixed time. Accordingly, a situation where a transparent state and a non-transparent state are changed repeatedly and alternately in a short period can be avoided in the case where a state of whether or not the player character and the object satisfy the predetermined relation is switched frequently, making it possible to grasp the display contents easily. Also, since the display contents are grasped easily, the operability can be improved correspondingly.

Fifth Embodiment

In the fourth embodiment as described above, a process of making the three-dimensional object as the obstruction transparent is automatically performed after the elapse of a fixed time in the case where the player character is intercepted in the visual field by some obstruction placed within the game space as looked from the visual point position. However, the transmission process may be performed only by pressing a predetermined key of the controller 300.

Figure 23:
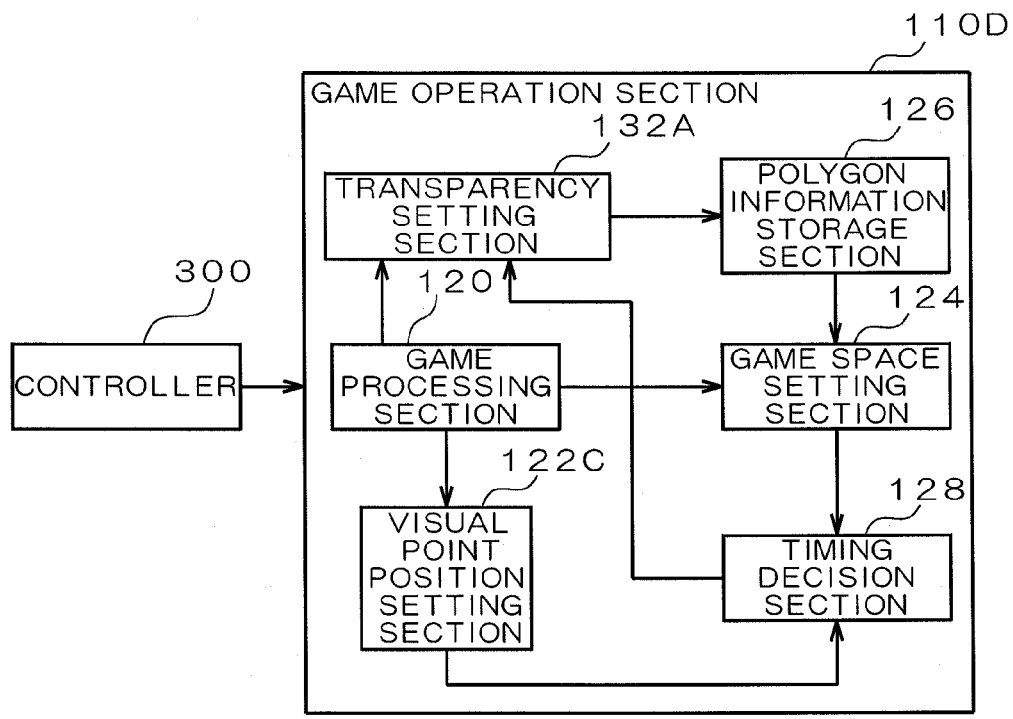
FIG. 23 is a block diagram partly showing a configuration of a game machine according to a fifth embodiment of the invention.
Figure 24:
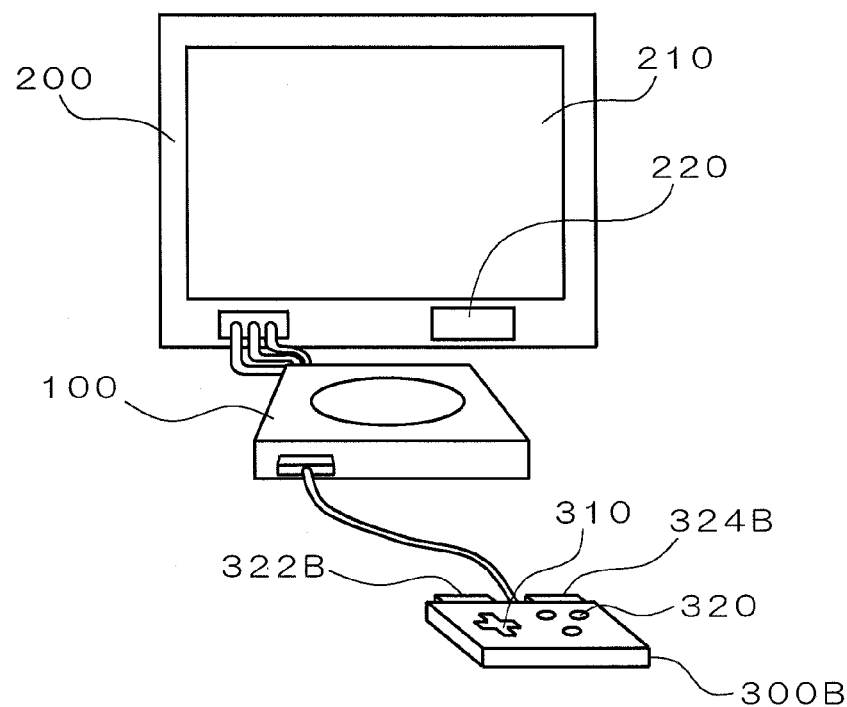
FIG. 24 is a view illustrating how the game machine and a peripheral device are connected in the fifth embodiment.

FIG. 23 is a block diagram partly showing the configuration of a game machine according to a fifth embodiment of the invention. FIG. 24 is a view showing how the game machine and a peripheral device are connected in the fifth embodiment. This game machine according to the fifth embodiment has fundamentally the same configuration as the game machine according to the fourth embodiment as described above, except for the internal configuration of a game operation section 110D and the functions of a left key 322B and a right key 324B of a controller 300B. The identical parts are not described in detail.

As shown in FIG. 23, the game operation section 110D of the fifth embodiment comprises a game processing section 120, a visual point position setting section 122C, a game space setting section 124, a polygon information storage section 126, a timing decision section 128, and a transparency setting section 132A. The game operation section 110D has the same configuration as the game operation section 110C in the fourth embodiment as described above, except for the transparency setting section 132A, and the different points from the other embodiments will be described below in detail.

The transparency setting section 132A sets the value of transparency of a polygon corresponding to a three-dimensional object as the obstruction existing between the visual point position and the player character. In this embodiment, the transparency setting section 132A sets the transparency of a polygon corresponding to the three-dimensional object as the obstruction existing between the visual point position and the player character at 100% to make the transmission process, if the player issues an instruction of effecting the transmission process via the controller 300, in the case where the timing decision section 128 decides that the player character is intercepted in the visual field as looked from the visual point position and outputs a notice for that. In this embodiment, when the left key 322B of the controller 300 is pressed, the transmission process is performed. Also, when the right key 324B is pressed, the value of the transparency is reset to 0% in the same manner as in the fourth embodiment, whereby the transparent state is released.

Accordingly, in the case where the player character is intercepted in the visual field as looked from the visual point position, the player can make the obstruction transparent at a desired timing by pressing the left key 322B, and release the transparent state at a desired timing by pressing the right key 324B.

Figure 25:
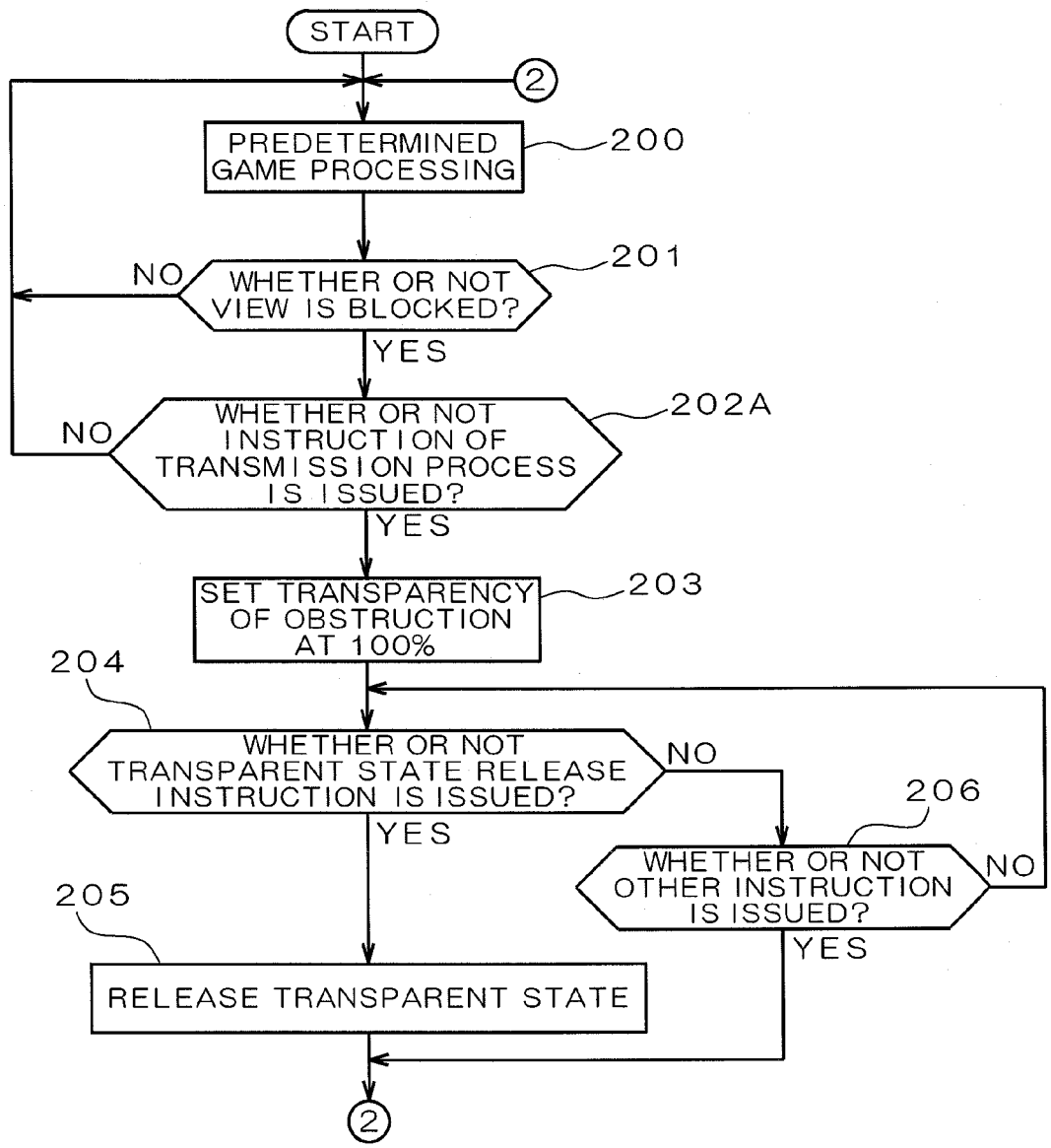
FIG. 25 is a flowchart showing an operation procedure of the game machine in the fifth embodiment.

FIG. 25 is, a flowchart showing an operation procedure of the game machine in the fifth embodiment, principally showing the movement of the player character and the operation procedure taken when the player character is hidden behind somewhat obstruction during the movement. The operation procedure as shown in FIG. 25 includes a step 202A as shown in FIG. 25, which replaces the operation of step 202 contained in the operation procedure of the fourth embodiment as described above and shown in FIG. 21, and will be described below by paying attention to this change point.

In the case where the player character is intercepted in the visual field by the object such as the mountain within the game space as looked from the visual point position, the timing decision section 128 makes a notice to the transparency setting section 132A that the player character is intercepted.

The transparency setting section 132A that receives the notice determines whether or not an instruction of performing the transmission process is issued by pressing the left key 322B of the controller 300 (step 202A). If the transmission process is not instructed, a negative decision is made at step 202A, and the procedure returns to step 200, whereby the processing following the step 200 is repeated.

If the transmission process is instructed, an affirmative decision is made at step 202A, and the transparency setting section 132A sets the transparency of the three-dimensional object as the obstruction existing between the current visual point position and the player character at 100% (step 203). As a result, the same image is displayed as shown in FIG. 22B described above in the fourth embodiment.

In this way, the transmission process for the object is not performed immediately when the player character and the object (obstruction) satisfy a predetermined relation, but performed only when the player presses the left key 322B of the controller 300. Accordingly, a situation where a transparent state and a non-transparent state are changed repeatedly and alternately in a short period can be avoided in the case where a state of whether or not the player character and the object satisfy the predetermined relation is switched frequently, making it possible to grasp the display contents easily. Also, since the display contents are grasped easily, the operability can be improved correspondingly.

Sixth Embodiment

In the fifth embodiment as described above, the transmission process is performed only when a predetermined key of the controller 300 is pressed. However, the transmission process may be automatically performed immediately after the player character is intercepted in the visual field by the object such as the mountain within the game space as looked from the visual point position, whereby the transparent degree may be changed slowly at first and then faster with the elapse of the time.

Figure 26:
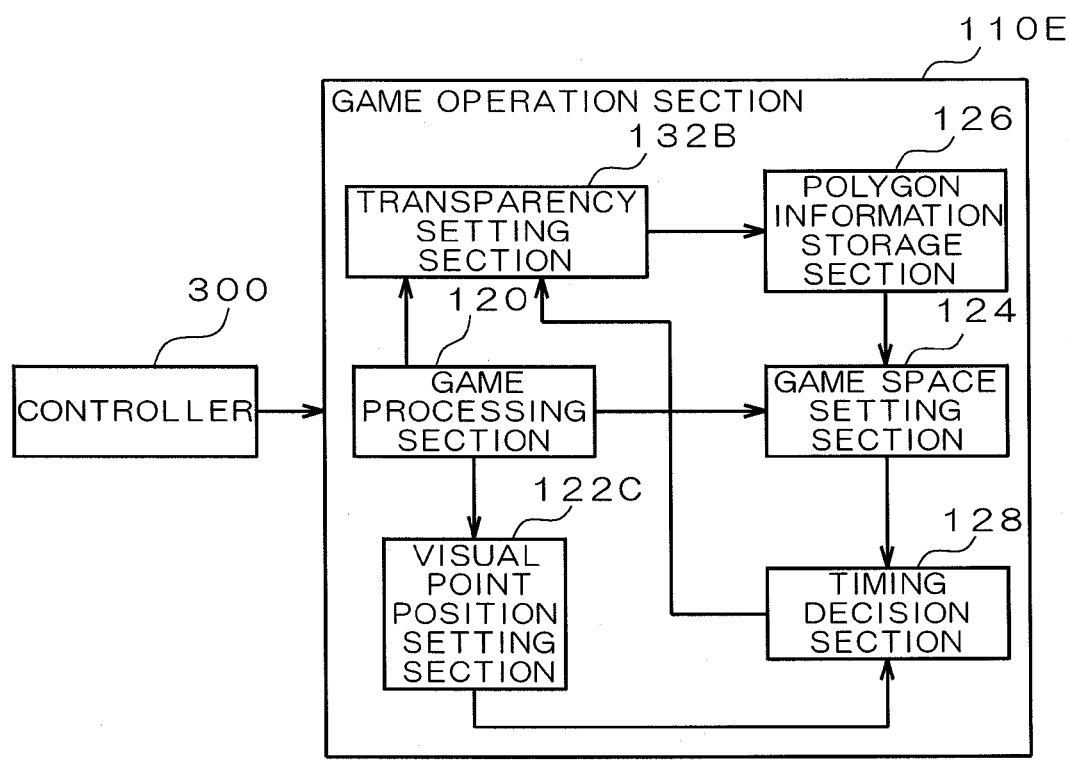
FIG. 26 is a block diagram partly showing a configuration of a game machine according to a sixth embodiment of the invention.

FIG. 26 is a block diagram partly showing the configuration of a game machine according to a sixth embodiment of the invention. This game machine according to the sixth embodiment has fundamentally the same configuration as the game machine according to the fourth embodiment as described above, except for the internal configuration of a game operation section 110E. The identical parts are not described in detail.

As shown in FIG. 26, the game operation section 110E of the sixth embodiment comprises a game processing section 120, a visual point position setting section 122C, a game space setting section 124, a polygon information storage section 126, a timing decision section 128, and a transparency setting section 132B. The game operation section 110E has the same configuration as the game operation section 110D in the fifth embodiment as described above, except for the transparency setting section 132B, and the different points from the other embodiments will be described below in detail.

The transparency setting section 132B sets the value of transparency of a polygon corresponding to a three-dimensional object as the obstruction existing between the visual point position and the player character. In this embodiment, the transparency setting section 132B sets the value of transparency of a polygon corresponding to the three-dimensional object as the obstruction existing between the visual point position and the player character gradually increasingly from an initial value (e.g., 0%) to 100% to make the transmission process, in the case where the timing decision section 128 decides that the player character is intercepted in the visual field as looked from the visual point position and outputs a notice for that. In increasing the value of transparency, the transparency setting section 132B sets the value of transparency so that the transparent degree changes slowly at first and then faster with the elapse of the time, as described above.

In the sixth embodiment, like the fourth embodiment, the transparency setting section 132B releases the transmission process when the left key 322B or right key 324B of the controller 300 is pressed.

Figure 27:
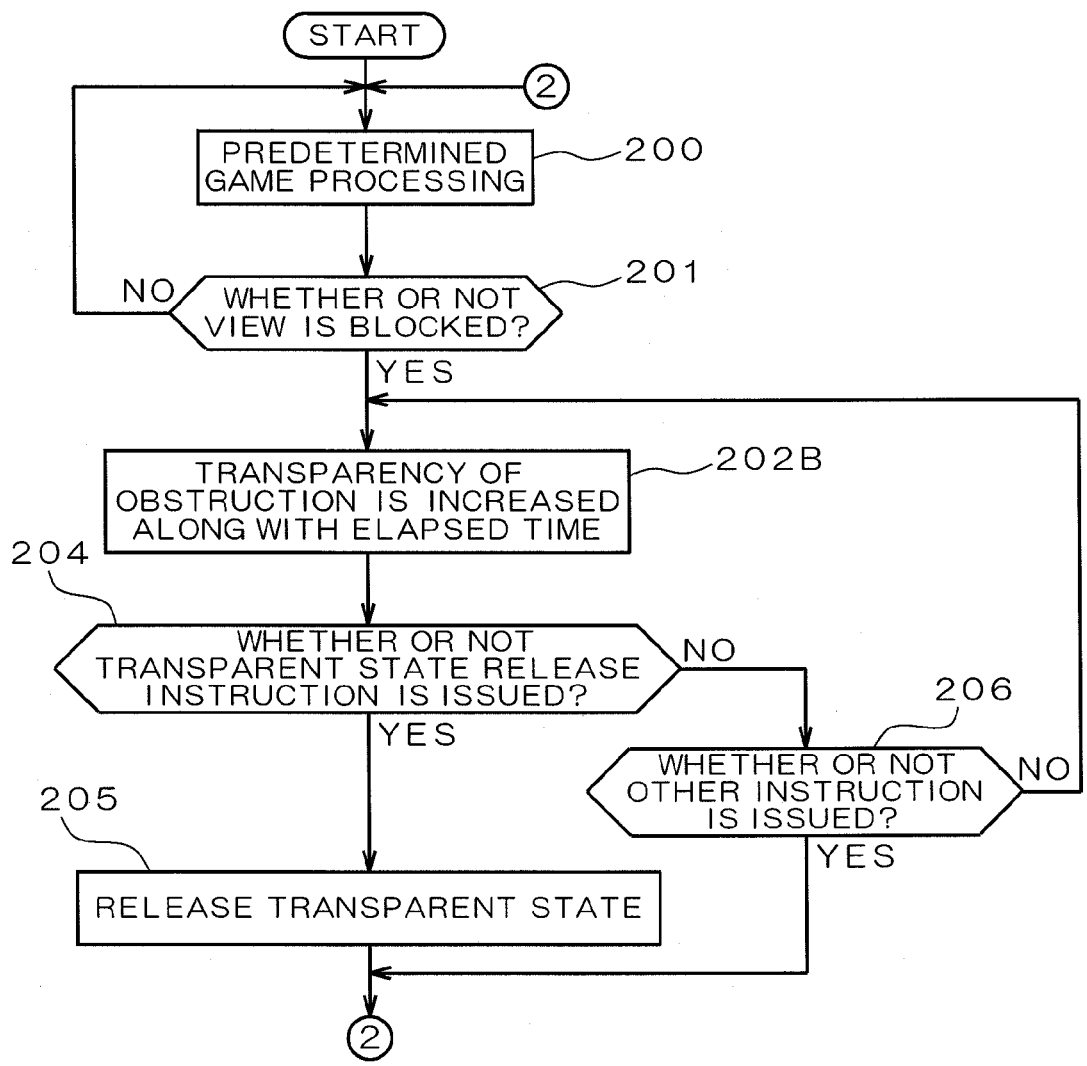
FIG. 27 is a flowchart showing an operation procedure of the game machine in the sixth embodiment.

FIG. 27 is a flowchart showing an operation procedure of the game machine in the sixth embodiment. The operation procedure as shown in FIG. 27 includes a step 202B as shown in FIG. 27, which replaces the operation of steps 202 to 203 contained in the operation procedure of the fourth embodiment as described above and shown in FIG. 21, and will be described below by paying attention to this change point.

In the case where the player character is intercepted in the visual field, an affirmative decision is made at step 201, and the timing decision section 128 makes a notice to the transparency setting section 132B that the player character is intercepted. The transparency setting section 132B that receives the notice increases the value of transparency along with the elapsed time since it has received the notice (step 202B). As described above, the transparency setting section 132B increases the value of transparency so that the transparent degree changes slowly at first and then faster with the elapse of the time. The process of increasing the value of transparency is performed until the value of transparency reaches 100%.

Along with the process of increasing the value of transparency at step 202B, the transparency setting section 132 determines whether or not an instruction of releasing the transparent state (transparent state release instruction) is issued (step 204). As described above, the player can issue an instruction of returning the visual point position to the original position by pressing the left key 322 or the right key 324 of the controller 300. If an instruction of returning the visual point position to the original position is issued, an affirmative decision is made at step 204, and then the transparency setting section 132 resets the transparency of a polygon corresponding to the three-dimensional object as the obstruction at, 0% (step 205). Thereafter, the procedure returns to step 200, whereby the processing following the step 200 is continued.

If the instruction of releasing the transparent state (transparent state release instruction) is not issued, a negative decision is male at step 204, and then the game processing section 120 determines whether or not other instruction is issued by operating the controller 300 (step 206). While the other instruction is not issued, the procedure returns to step 202B to continue the process of increasing the transparency. Also, if the other instruction is issued, an affirmative decision is made at step 206, and then the game processing section 120 returns to step 200 to effect a game process corresponding to the content of a pressed key.

In this way, the transmission process for the object is not performed immediately when the player character and the object (obstruction) satisfy a predetermined relation, but performed in such a manner that the transparent degree (transparency) is changed slowly at first. Hence, a situation where the appearance of the object is largely changed in a short period can be avoided in the case where a state of whether or not the player character and the object satisfy the predetermined relation is switched frequently, making it possible to grasp the display contents easily. Also, since the display contents are grasped easily, the operability can be improved correspondingly.

Seventh Embodiment

By the way, in a seventh embodiment, unlike the first to sixth embodiments as described above, in the case where the player character is intercepted in the visual field by an object such as a mountain located within the game space as looked from the visual point position, a predetermined mark image indicating the existing position of the player character is generated and composed on a game image, whereby the existing position of the player character can be known. Therefore, it is possible to avoid the abrupt change in the visual field direction that may be caused when the visual point is abruptly shifted, and prevent the operability from degrading.

Figure 28:
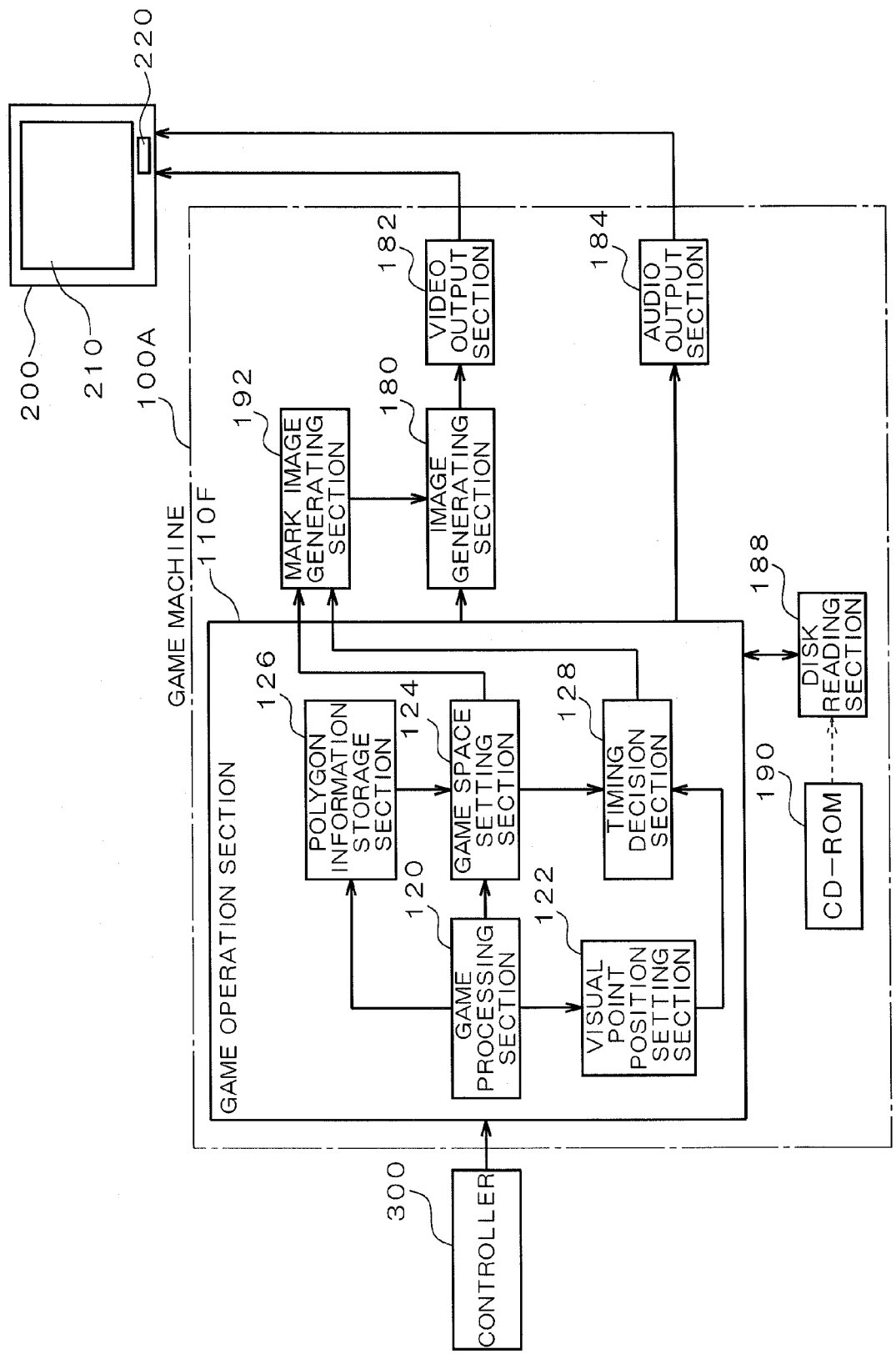
FIG. 28 is a block diagram showing a configuration of a game machine according to a seventh embodiment of the invention.

FIG. 28 is a block diagram showing the configuration of a game machine 100A according to the seventh embodiment of the present invention. In FIG. 28, the same parts are designated by the same numerals as used in the first to sixth embodiments as described above, and the detailed operation of the same parts is not described.

As shown in FIG. 28, the game machine 100A comprises a game operation section 110F, an image generating section 180, a video output section 182, an audio output section 184, a disk reading section 188, and a mark image generating section 192. Also, the game operation section 110F comprises a game processing section 120, a visual point position setting section 122C, a game space setting section 124, a polygon information storage section 126, and a timing decision section 128.

The mark image generating section 192 acquires the information regarding the position of the player character within the game space from the game space setting section 124, generates a predetermined mark image indicating the existing position of the player character on the basis of this positional information, and outputs this mark image to the image generating section 180, in the case where the timing decision section 128 outputs a notice indicating that the player character is intercepted in the visual field as looked from the visual point position.

Figure 29A:
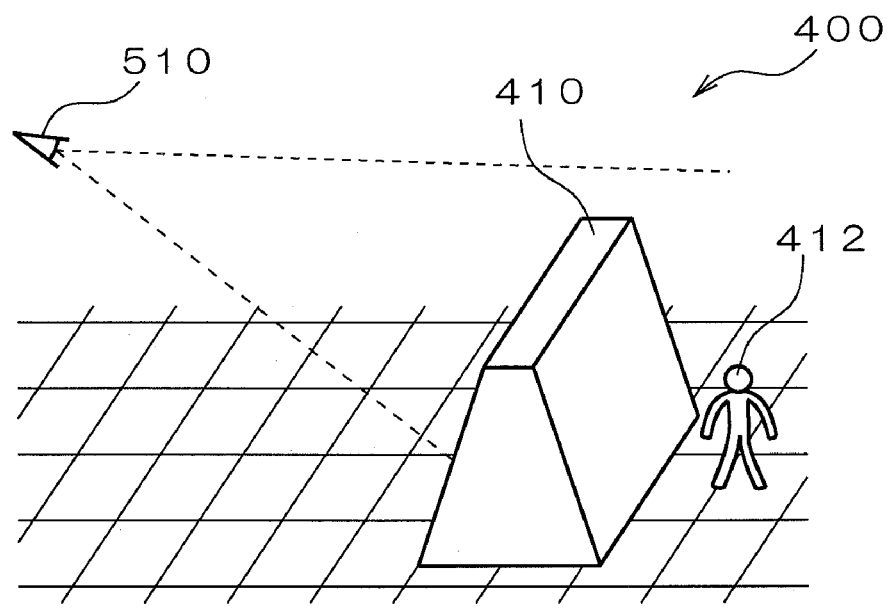
FIGS. 29A and 29B are views for explaining a process for generating a mark image.
Figure 29B:
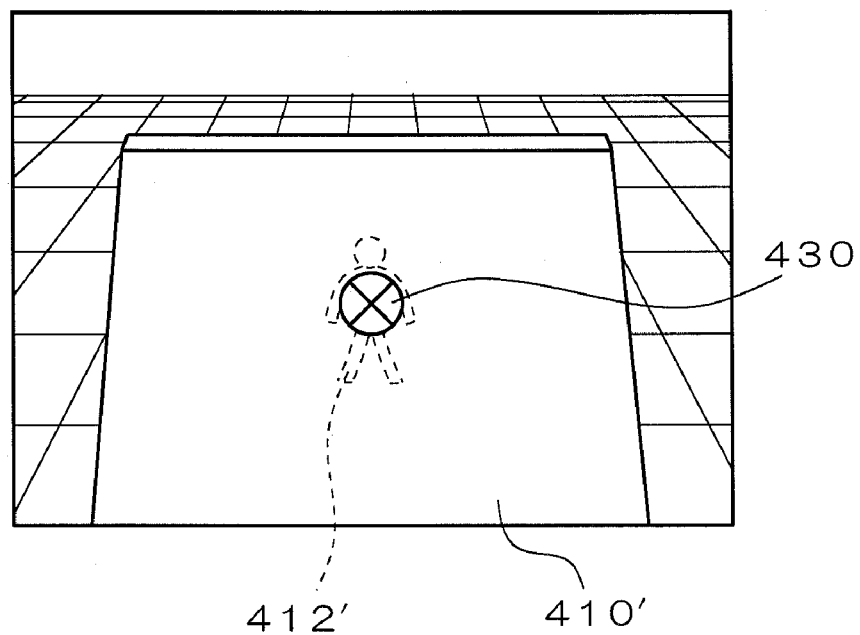

FIG. 29 is a view for explaining a process of generating the mark image. As shown in FIG. 29A, when the player character 412 approaches the three-dimensional object 410 and is intercepted in the visual field as looked from the visual point position 510, a player character image 412' is intercepted by a three-dimensional image 410' and disappears from the display screen in a display example as shown in FIG. 29B. In this way, in the case where the player character 412 is intercepted, a predetermined mark image 430 as shown in FIG. 29B is generated by the mark image generating section 192, and displayed at a position corresponding to the existing position of the player character 412. Due to this mark image 430, the player can know the existing position of the player character.

In this way, since the player can know the existing position of the player character by displaying the predetermined mark image 430 when the player character and the object (obstruction) satisfy the predetermined relation, it is possible to avoid the abrupt change in the visual field direction that may be caused when the visual point is abruptly shifted, and prevent the operability from degrading.

Modified Embodiment

This invention is not limited to the above embodiments, and may be modified in various ways within a spirit or scope of the invention. For example, in the above embodiments, the timing decision section 128 determines whether or not the player character is intercepted in the visual field by the object existing between the visual point position and the player character as looked in a direction toward the player character from the visual point position, on the basis of the visual point position set by the visual point position setting section 122 and the detailed shape (particularly the vertex coordinates) of the object other than the player character calculated by the game space setting section 124. However, the timing decision section 128 may decide the timing at which the object is contained in a predetermined range around the player character.

Figure 30:
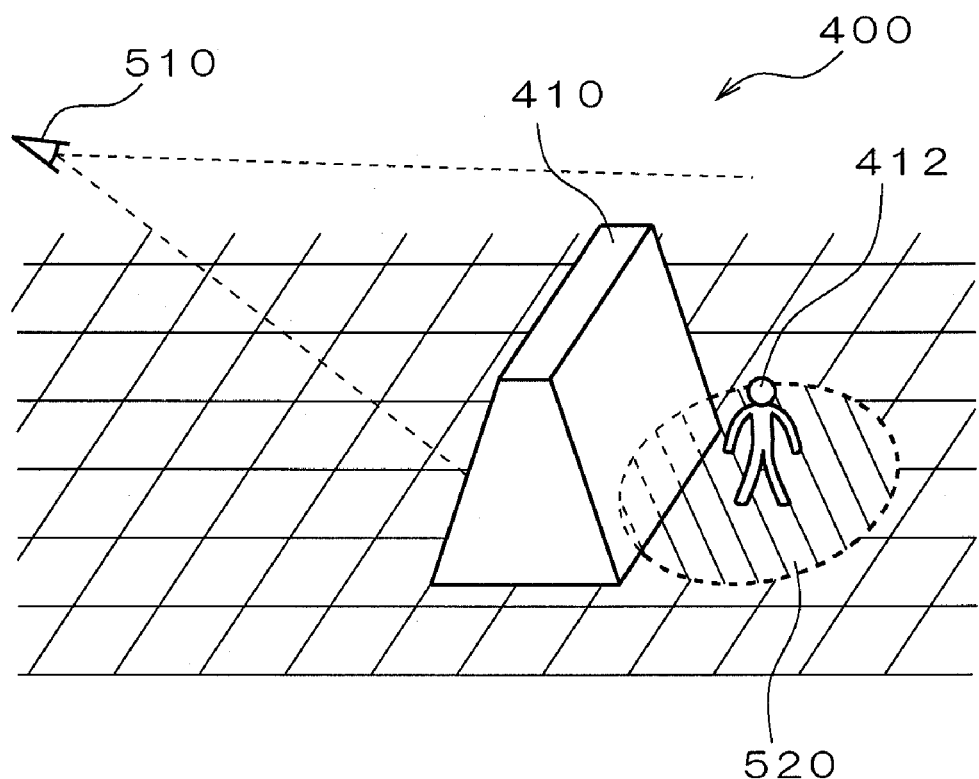
FIG. 30 is a view for explaining a variation of a process for deciding the timing at which an object is contained in a predetermined range around a player character.

FIG. 30 is a view for explaining a modified embodiment in the case of deciding the timing at which the object is contained in a predetermined range around the player character. As shown in FIG. 30, this modified embodiment may be implemented by, for example, presetting an area 520 represented by a circle having a predetermined radius centered at the player character 412, deciding the timing at which the three-dimensional object 410 is contained in the area 520 when the player character approaches the three-dimensional object 410, and then performing the shift process of the visual point position or the transmission process as in the above embodiments. The area 520 is represented by the circle centered at the player character 412 as shown in FIG. 30, but may be represented by a predetermined rectangular area around the player character or in other ways.

In deciding the timing, the height of object that is subjected to decision may be limited to exceed the height of the player character. Since for the object lower than the player character, the player character is not entirely intercepted when the visual point position is above the height of the player character, such object can be excluded from the timing decision, thereby simplifying and speeding up the processing.

In the game machine of the above embodiments, particularly in the game machine with the shift of the visual point position, it is desirable to display an auxiliary image for indicating the current visual field direction on a part of the display screen, for example, on a right lower part of the display screen as shown in FIG. 13. This auxiliary image is displayed before and after the change of the visual point position, and during the change, whereby it is possible to grasp easily to what extent the visual point position is changed.

In the above embodiments, a roll playing game is practiced, using a home game machine. However, the invention can be applied to the game machine for other games than the roll playing game, or the game machine for business installed at the game center.

In the above embodiments, the CD-ROM 190 is considered as the information storage medium storing the game program, but instead a DVD-ROM, a ROM cartridge, a hard disk, and a data cartridge by the use of a tape medium may be employed. In this case, instead of the disk reading section 188, the data reading section corresponding to the information storage medium may be provided.

The invention claimed is:

1. A game machine, comprising:
   movement instructing unit for instructing the movement of a player character in a three-dimensional virtual space;
   space setting unit for setting the shapes of said player character and an object existing around the player character and their arrangement in said virtual space;
   image generating unit for generating an image in said virtual space as looked from a virtual visual point position;
   timing decision unit for deciding the timing at which said player character and said object satisfy relatively a predetermined relation for at least one of the shapes and the arrangement in said virtual space;
   a timer for measuring a fixed time after said timing decision unit decides that said player character and said object satisfy the predetermined relation; and
   visual point position setting unit for shifting said visual point position along with the movement of said player character so that said player character may be contained in a visual field range, and changing said visual point position in a predetermined range almost centered at said player character, when the elapse of said fixed time is detected by said timer.

2. The game machine according to claim 1, wherein said timing decision unit decides the timing at which said player character is intercepted in the visual field by said object, as looked from said visual point position in a direction toward said player character, on the basis of the shapes of said player character and said object and their arrangement in said virtual space.

3. The game machine according to claim 1, wherein said timing decision unit decides the timing at which said object is contained in a predetermined range around said player character.

4. The game machine according to claim 3, wherein said visual point position is set above the height of said player character, and said timing decision unit decides the timing for said object above the height of said player character.

5. The game machine according to claim 1, wherein said visual point position setting unit changes said visual point position by rotating said visual point position by a predetermined angle around a rotational center of said player character position.

6. The game machine according to claim 5, wherein said image generating unit generates said image continuously while said visual point position is being rotated by said visual point position setting unit.

7. The game machine according to claim 5, wherein said visual point position setting unit continues an operation of rotating said visual point position, until said player character is kept from being intercepted by said object as looked from said visual point position.

8. The game machine according to claim 1, further comprising return instructing unit for making a return instruction of returning the changed visual point position to an original state, when said visual point position is changed, wherein said visual point position setting unit returns said changed visual point position to the original state, when the return instruction is made by said return instructing unit.

9. A game machine, comprising:
   movement instruction unit instructing the movement of a player character in a three-dimensional virtual space;
   space setting unit for setting the shapes of said player character and an object existing around the player character, and their arrangement in said virtual space;
   image generating unit for generating an image in said virtual space as seen from a virtual visual point position;
   change instructing unit for instructing the change of said visual point position; and visual point position setting unit for shifting said visual point position set in said virtual space, along with the movement of said player character, so that said player character may be contained in a visual field range, and changing said visual point position in a predetermined range almost centered at said player character, when a change instruction is made by said change instructing unit after a predetermined duration being greater than zero.

10. The game machine according to claim 9, wherein said visual point position setting unit changes said visual point position by rotating said visual point position by a predetermined angle around a rotational center of said player character position.

11. The game machine according to claim 10, wherein said image generating unit generates said image continuously while said visual point position is being rotated by said visual point position setting unit.

12. The game machine according to claim 10, wherein said visual point position setting unit continues an operation of rotating said visual point position, until said player character is kept from being intercepted by said object as looked from said visual point position.

13. The game machine according to claim 9, further comprising return instructing unit for making a return instruction of returning the changed visual point position to an original state, when said visual point position is changed, wherein said visual point position setting unit returns said changed visual point position to the original state, when the return instruction is made by said return instructing unit.

14. A game machine, comprising:
movement instructing unit for instructing the movement of a player character in a threedimensional virtual space;
space setting unit for setting the shapes of said player character and an object existing around the player character, and their arrangement in said virtual space;
image generating unit for generating an image in said virtual space as seen from a virtual visual point position;
timing decision unit for deciding the timing at which said player character and said object satisfy relatively a predetermined relation for at least one of the shapes and the arrangement in said virtual space;
return instructing unit for making a return instruction of returning the changed degree of transparency for the object to an original state, when the degree of transparency for said object is changed;
visual point position setting unit for shifting said visual point position, along with the movement of said player character, so that said player character may be contained in a visual field range; and
transmission processing unit for performing a transmission process of changing the degree of transparency for the object placed between said player character and said visual point position, when said timing decision unit decides that said player character and said object satisfy the predetermined relation and after the elapse of a time greater than zero, as well as returning the changed degree of transparency to the original state, when a return instruction is issued by said return instructing unit.

15. The game machine according to claim 14, wherein said timing decision unit decides the timing at which said player character is intercepted in the visual field by said object, as looked from said visual point position in a direction toward said player character, on the basis of the shapes of said player character and said object and their arrangement in said virtual space.

16. The game machine according to claim 14, wherein said timing decision unit decides the timing at which said object is contained in a predetermined range around said player character.

17. The game machine according to claim 16, wherein said visual point position is set above the height of said player character, and said timing decision unit decides the timing for said object above the height of said player character.

18. An information storage medium storing a program for enabling a computer to execute a process of deciding a timing at which player character and an object existing around the player character satisfy relatively a predetermined relation for at least one of a shape and an arrangement in a virtual space, and changing the visual point position in a predetermined range almost centered at said player character after the elapse of a fixed time wherein said fixed time is more than zero.

* * * * *